United States Patent [19]

Koliopoulos et al.

[11] Patent Number: 5,680,976

[45] Date of Patent: Oct. 28, 1997

[54] MULTI-FUNCTIONAL ACCESSORY CARRIER

[76] Inventors: John A. Koliopoulos, 140 W. 23rd Ave., San Mateo, Calif. 94403; Matthew L. Simons, 1613 Westmoor Rd., Burlingame, Calif. 94010

[21] Appl. No.: 522,605

[22] Filed: Sep. 1, 1995

[51] Int. Cl.$^6$ .................................................. B60R 9/06
[52] U.S. Cl. .................. 224/524; 224/505; 224/282; 224/521; 414/462
[58] Field of Search .................. 224/499–504, 224/282, 524, 488, 495, 497, 505–508, 522, 523, 529, 518, 521, 531, 532; 414/462

[56] References Cited

U.S. PATENT DOCUMENTS

| | | |
|---|---|---|
| 736,814 | 8/1903 | Brown . |
| 1,849,046 | 3/1932 | Arndt . |
| 4,099,760 | 7/1978 | Mascotte et al. ............... 224/524 |
| 4,189,274 | 2/1980 | Shaffer ............................ 414/462 |
| 4,221,311 | 9/1980 | Penn ................................ 224/503 |
| 4,297,069 | 10/1981 | Worthington ................. 414/462 |
| 4,630,990 | 12/1986 | Whiting ......................... 414/462 |
| 4,635,835 | 1/1987 | Cole . |
| 4,640,658 | 2/1987 | Webb, Jr. ....................... 414/462 |
| 4,741,660 | 5/1988 | Kent ................................ 414/462 |
| 4,771,926 | 9/1988 | Anderson et al. . |
| 4,775,282 | 10/1988 | Van Vliet ....................... 414/462 |
| 4,813,584 | 3/1989 | Wiley . |
| 4,915,276 | 4/1990 | Devito . |
| 4,934,894 | 6/1990 | White .............................. 414/462 |
| 4,938,399 | 7/1990 | Hull et al. . |
| 4,971,509 | 11/1990 | Sechovec et al. .............. 414/462 |
| 5,000,363 | 3/1991 | Linquist . |
| 5,011,361 | 4/1991 | Peterson ......................... 414/462 |
| 5,033,662 | 7/1991 | Godin . |

(List continued on next page.)

FOREIGN PATENT DOCUMENTS

| | | | |
|---|---|---|---|
| 614858 | 9/1926 | France .............................. | 224/529 |
| 79713 | 2/1952 | Norway ............................ | 224/502 |

OTHER PUBLICATIONS

Bruno Independent Living Aids—Wheelchair and Scooter Lifts—(See A).
Chrysler Corp. Parts—1993 Catalog (See B, #10, #11).
Butler—Wheelchair Carrier (See C).
Troxel—Bicycle Carrier (See D).
Northern Catalog—Various Carriers (See E; 1,2,3,4).
Lange Originals (See F; 1,2).

*Primary Examiner*—Henry J. Recla
*Assistant Examiner*—Gregory M. Vidovich
*Attorney, Agent, or Firm*—Frazzini & Kassatly; Samuel Kassatly

[57] ABSTRACT

A cargo and accessory carrier for attachment to a vehicle receiver hitch includes a riser assembly secured to the vehicle, a door assembly pivotally secured to the riser assembly, and a platform assembly pivotally secured to the door assembly for carrying cargo at a desirable elevation above ground level, such that the door assembly can be pivotally rotated in a horizontal plane and a parallel plane while secured to the riser assembly. The platform assembly can be rotated about the door assembly and maintained in a vertical or horizontal position relative to ground, whether or not it carries a load or it is installed on the vehicle. The carrier provides a multipurpose support assembly which can be used as a "stand alone" unit to carry cargo, and which can be used in combination with other accessory carriers such as a cargo chest, bicycle carrier, ski carrier or any number of other accessory-carrying devices. It provides access to the vehicle rear compartment door without removal of the cargo or the carrier itself from the vehicle, regardless of the position of the platform assembly. It adds flexibility and it may be adapted to any type of vehicle configuration. It does not require attachment to the bumper or bumper mounting brackets, vehicle frame, or vehicle body, and can be adapted to any size receiver hitch configuration. It can be resized by merely changing the lengths of the riser beam, door beam and platform assembly tubes.

15 Claims, 19 Drawing Sheets

U.S. PATENT DOCUMENTS

| | | | |
|---|---|---|---|
| 5,038,983 | 8/1991 | Tomososki . | |
| 5,067,641 | 11/1991 | Johnson et al. . | |
| 5,104,015 | 4/1992 | Johnson | 224/499 |
| 5,122,024 | 6/1992 | Stokes | 414/462 |
| 5,137,411 | 8/1992 | Eul et al. | 414/462 |
| 5,145,308 | 9/1992 | Vaughn et al. | 414/462 |
| 5,186,371 | 2/1993 | Jozefczak et al. | 224/503 |
| 5,190,195 | 3/1993 | Fullhart et al. | 224/519 |
| 5,215,234 | 6/1993 | Pasley . | |
| 5,219,105 | 6/1993 | Kravitz . | |
| 5,224,636 | 7/1993 | Bounds . | |
| 5,269,446 | 12/1993 | Biehn . | |
| 5,330,084 | 7/1994 | Peters | 224/532 |
| 5,427,289 | 6/1995 | Oster | 224/282 |
| 5,439,151 | 8/1995 | Clayton | 224/521 |
| 5,454,496 | 10/1995 | Sumida et al. | 224/521 |
| 5,492,454 | 2/1996 | Colyer | 414/462 |

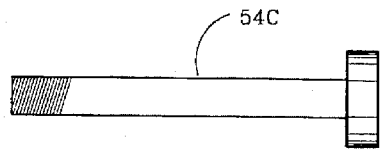
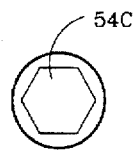
FIGURE 20  FIGURE 21
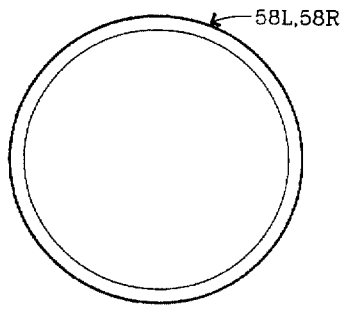
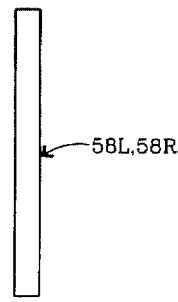
FIGURE 18  FIGURE 19
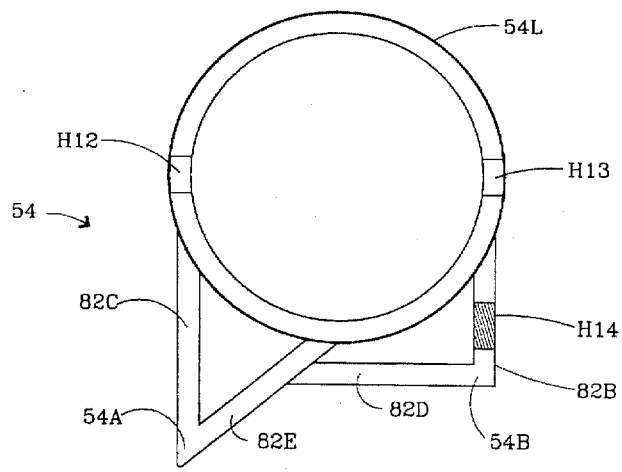
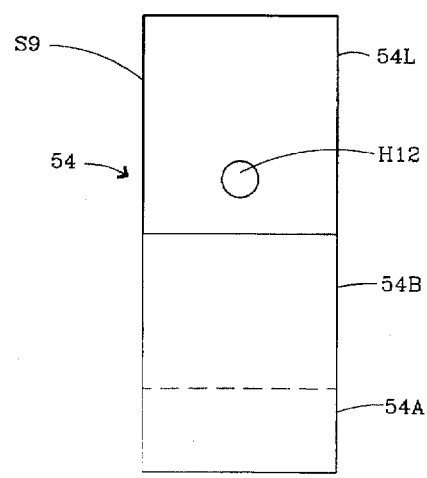
FIGURE 16  FIGURE 17

MULTI-FUNCTIONAL ACCESSORY CARRIER

BACKGROUND OF THE INVENTION

1. Field of the Invention

The present invention relates in general to cargo and accessory carriers, and it particularly relates to a multi-functional assembly used to carry cargo or accessories, such as a cargo box, a bicycle carrier, a ski carrier, a fishing pole carrier, a cargo carrying tray, a cargo carrying cage, or any number of other accessory carrying devices, when it is secured to a vehicle receiver hitch.

2. Background Art

Sport Utility Vehicles (SUV) have become quite popular, and many SUV are capable of being fitted with a draw bar incorporating a receiver hitch. Receiver hitches are generally designed to tow a non-motorized wheeled vehicle, such as a boat and/or trailer, behind a motorized vehicle. Other devices can be secured to a vehicle for the purpose of hauling several kinds of cargo. For example, roof top style cargo carriers are known to accommodate luggage, bicycles, and skis. However, lifting the cargo can be difficult, if not impossible without a ladder or some other mechanism to increase the range of the user's height. Access to the cargo is cumbersome and the mounting hardware does not lend itself to convenient installation and dismantling. Also, low height clearances may present some concern.

Several types of carrying devices which utilize the receiver hitch are available. However, these devices are designed with limited functions and for specialized purposes, and are not adaptable to accommodate a multitude, or a wide variety of cargo or accessories. For instance, a carrying device designed to carry bicycles is not readily adaptable, if at all, to accommodate luggage. As a result, the user, and more specifically the consumer, has to acquire several carrying devices to haul various types of cargo and accessories.

In some instances the support structure employed is one and the same with the carrying device. U.S. Pat. No. 5,067,641 to Johnson et al. describes a support structure which is incorporated with the carrying device, for the purpose of carrying bicycles. U.S. Pat. No. 5,038,983 to Tomososki et al., describes a support structure and a carrying tub that form integral units, and which are designed to carry only the content of the tub. The support structure in U.S. Pat. No. 4,635,835 to Cole is designed solely for transporting "All Terrain" vehicles. U.S. Pat. No. 5,145,308 to Vaughn is designed mainly for supporting a platform to haul a motorcycle.

A number of devices which use the vehicle bumper and/or bumper mounting brackets are used as a mounting point, as exemplified in U.S. Pat. No. 5,269,446 to Biehm. Vehicle manufacturers have integrated the bumpers into the vehicle design and attachment to integrated bumpers and/or access to the bumper mounting hardware can be very limited and in some cases impossible.

Also, in recent years, the auto/truck bumper design incorporates plastic or composite materials rather than steel. Sufficient weight bearing characteristics are critical. It is known that many bumpers and bumper mounting hardware are not structurally capable of handling significant weight loads safely. In addition, passenger safety can be affected if bumper safety design is compromised by adding affixments to the bumper or the bumper mounting points.

Additionally, ground clearance at the rear of the vehicle is crucial. Extension of the horizontal plane of the receiver hitch behind the vehicle can damage the carrying device and/or the cargo when a load is placed on the carrying device. Safety issues arise, with the vehicle in motion, if the carrying device collides with an obstruction or some other roadway obstacle. Also, with a load at a lower horizontal plane, user safety is compromised by lifting heavy objects from the carrying device.

Furthermore, conventional devices are installed in a fixed position, and significantly limit access to the rear of the vehicle. The cargo and/or the carrying device must be removed for the rear of the vehicle to become accessible. Yet another limitation of the conventional devices is that the carrying device remains in one fixed position when not in use.

Such exemplary conventional devices are illustrated in the following references:

U.S. Pat. No. 5,219,105 to Kravitz,
U.S. Pat. No. 5,145,308 to Vaughn,
U.S. Pat. No. 5,137,411 to Eul et al.,
U.S. Pat. No. 5,122,024 to Stokes,
U.S. Pat. No. 5,067,641 to Johnson et al.,
U.S. Pat. No. 5,011,361 to Peterson,
U.S. Pat. No. 4,971,509 to Sechovec,
U.S. Pat. No. 4,938,399 to Hull et al.,
U.S. Pat. No. 4,934,894 to White,
U.S. Pat. No. 4,915,276 to Devito,
U.S. Pat. No. 4,813,584 to Wiley,
U.S. Pat. No. 4,741,660 to Kent,
U.S. Pat. No. 4,640,658 to Webb, Jr.,
U.S. Pat. No. 4,635,835 to Cole, and
U.S. Pat. No. 1,849,046 to Arndt.

SUMMARY OF THE INVENTION

The present invention is directed toward a unique multi-purpose, multi-functional cargo and accessory carrier for use with a motorized or even a non-motorized wheeled vehicle. The carrier includes a cargo carrying platform assembly which is raised above the plane of the receiver hitch in order to provide substantial ground clearance to the rear of a vehicle, particularly when traversing a rugged terrain and it further provides optimum user safety by minimizing the potential effects of lifting heavy objects from a low horizontal plane.

This multi-purpose carrier can be used as a stand-alone unit to carry cargo, or it can be used in combination with other accessory carriers such as a cargo chest, bicycle carrier, ski carrier or any number of other accessory carrying devices.

An additional feature of the present carrier lies in its ability to provide the function of tilting the platform assembly from a horizontal position to a vertical position (or vise versa) when installed on the vehicle. This will enable the size of the carrier to become compact by conveniently reducing its size when it is mounted to the vehicle but is not in use, or when it is stored away.

Another feature of the present carrier is to provide access to the vehicle rear compartment door or gate without removing of the cargo, whether the platform assembly is in the horizontal or vertical position.

The carrier is relatively simple to install and to remove. It provides a safe and secure means of transporting a variety of cargo and accessories. It is universally adaptable to any type vehicle, regardless of make, model or size. It does not require attachment to the bumper or bumper mounting brackets, frame of the vehicle, or the body of the vehicle, to provide a secure device which can not be removed by vandalism. The locking style hitch pins can be locked by means of a lock cylinder and key. The carrier can be mounted and secured to a receiver hitch placed at any point of a motorized or non-motorized vehicle, such the rear, the front, the sides or the top of the vehicle.

Furthermore, the carrier of the present invention can be adjusted closer or farther from the rear of the vehicle in order to accommodate differences in vehicle configurations. For example, custom bumpers may extend farther from the vehicle than would a vehicle manufacturer's standard bumper. Some vehicles have optional spare tire mounts that attach to the rear of the vehicle. In both of these examples, the device can be adjusted to accommodate these variations. It is adaptable to any size receiver hitch configuration. Also the carrier may not be subject to state motor vehicle licensing fees, as in the case with wheeled devices.

Briefly, the foregoing and other features of the present invention are achieved by providing a unique and improved cargo and accessory carrier which is adapted for use with a vehicle having a receiver hitch. The carrier generally includes a riser assembly, door assembly and platform assembly. The door assembly is secured to the riser assembly by way of a hinge and a latch. The door assembly is inserted through the platform assembly by way of corresponding holes that are manufactured in the platform assembly side plates.

The platform assembly maintains relative position to the door assembly by way of sleeves and sleeve washers, wherein, the sleeves are permanently attached to the door assembly. One end of a receiver insert tube is inserted into a receiver hitch incorporated in the lower center portion of the riser assembly, and the opposite end of the receiver insert tube is inserted into the receiver hitch that is affixed to the vehicle, without attachment to the bumper, frame or body of the vehicle.

The riser assembly is elevated from the plane of the vehicle's receiver hitch by way of a gusset assembly and spaced rearwardly apart from the vehicle, via the receiver hitch insert tube which can be lengthened or shortened to accommodate a spare tire and/or other vehicle idiosyncrasies. The platform assembly can be tilted up or down, in a vertical or horizontal position while installed on the door assembly.

The door assembly and the platform assembly, as a single unit, can be disengaged from the riser assembly, via a latch on the riser assembly, and swing away from the rear of the vehicle, via the hinge, for unobstructed access to the rear of the vehicle. The swing away function can be performed while the platform assembly is either in a horizontal or vertical position, with or without cargo. The platform assembly can accept attachments for, but not limited to, mounting a bicycle carrier, snow ski carrier, gas cans, storage chest, fishing poles. The carrier is adaptable to carry various forms of cargo in both the horizontal and vertical positions.

BRIEF DESCRIPTION OF THE DRAWING

The above and other features of the present invention and the manner of attaining them, will become apparent, and the invention itself will be best understood, by reference to the following description and the accompanying drawings, wherein:

FIG. 16 is a side elevational view of a platform support sleeve which forms part of the door assembly of FIGS. 12 and 15;

FIG. 17 is a front elevational view of a platform support sleeve which forms part of the door assembly of FIGS. 12, 15 and 16;

FIG. 18 is a side elevational view of a sleeve spacer which forms part of the door assembly of FIG. 12;

FIG. 19 is a front elevational view of a sleeve spacer which forms part of the door assembly of FIG. 12;

FIG. 20 is a side elevational view of a sleeve bolt which forms part of the door assembly of FIGS. 12 and 15;

FIG. 21 is a front elevational view of a sleeve bolt which forms part of the platform support sleeve of FIGS. 12 and 15;

Similar numerals refer to similar elements in the drawing. It should be understood that the sizes of the different components in the Figures are not in exact proportion, and are shown for visual clarity and for the purpose of explanation.

DETAILED DESCRIPTION OF THE PREFERRED EMBODIMENT

Figure 1:
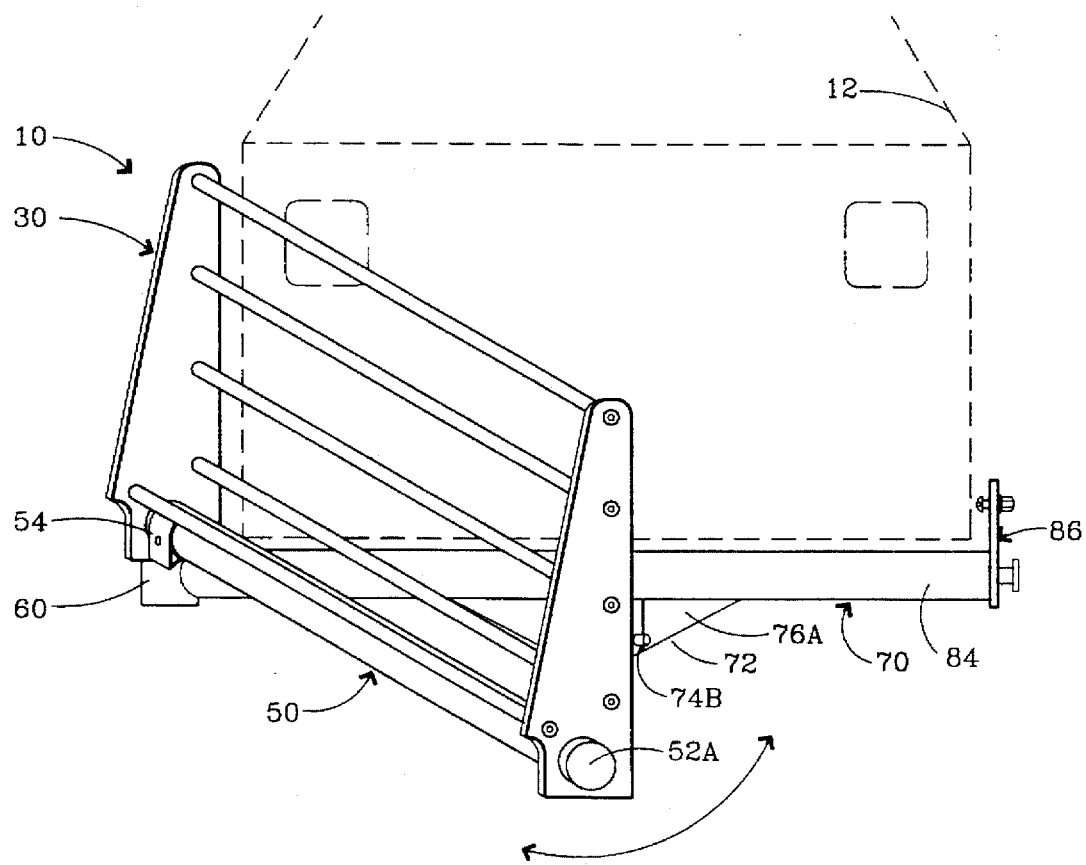
FIG. 1 is a perspective view of a preferred embodiment of a multi-functional accessory carrier according to the present invention, comprised of a riser assembly, a door assembly, and a platform assembly, and shown secured to the rear of a vehicle in an upright, partially open vertical position.

A preferred embodiment of a multi-functional cargo/accessory carrier 10 is illustrated in FIGS. 1 through 4, and is shown secured to the rear of a vehicle 12 (shown in dashed lines). The carrier 10 generally includes a riser assembly 70, a door assembly 50 and a platform assembly 30. The platform assembly 30 is attached to the door assembly 50, which, in turn, is pivotally secured to the riser assembly 70. In this particular example, most of the main components forming the riser assembly 70 and the door assembly 50 are made of stainless steel, and most of the main components forming the platform assembly 30 are made of aluminum.

Figure 5:
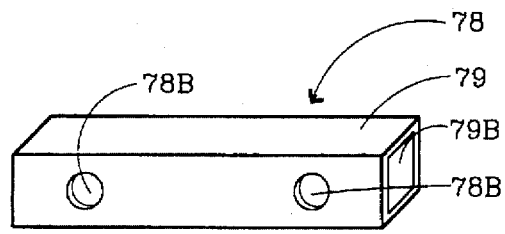
FIG. 5 is a perspective side elevational view of a first design for a receiver insert tube forming part of the riser assembly of the carrier shown in FIGS. 1 through 4.
Figure 6:
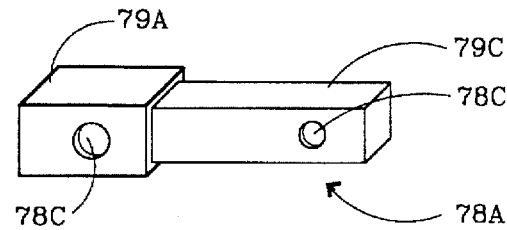
FIG. 6 is a perspective side elevational view of a second design for a receiver insert tube forming part of the riser assembly.
Figure 7:
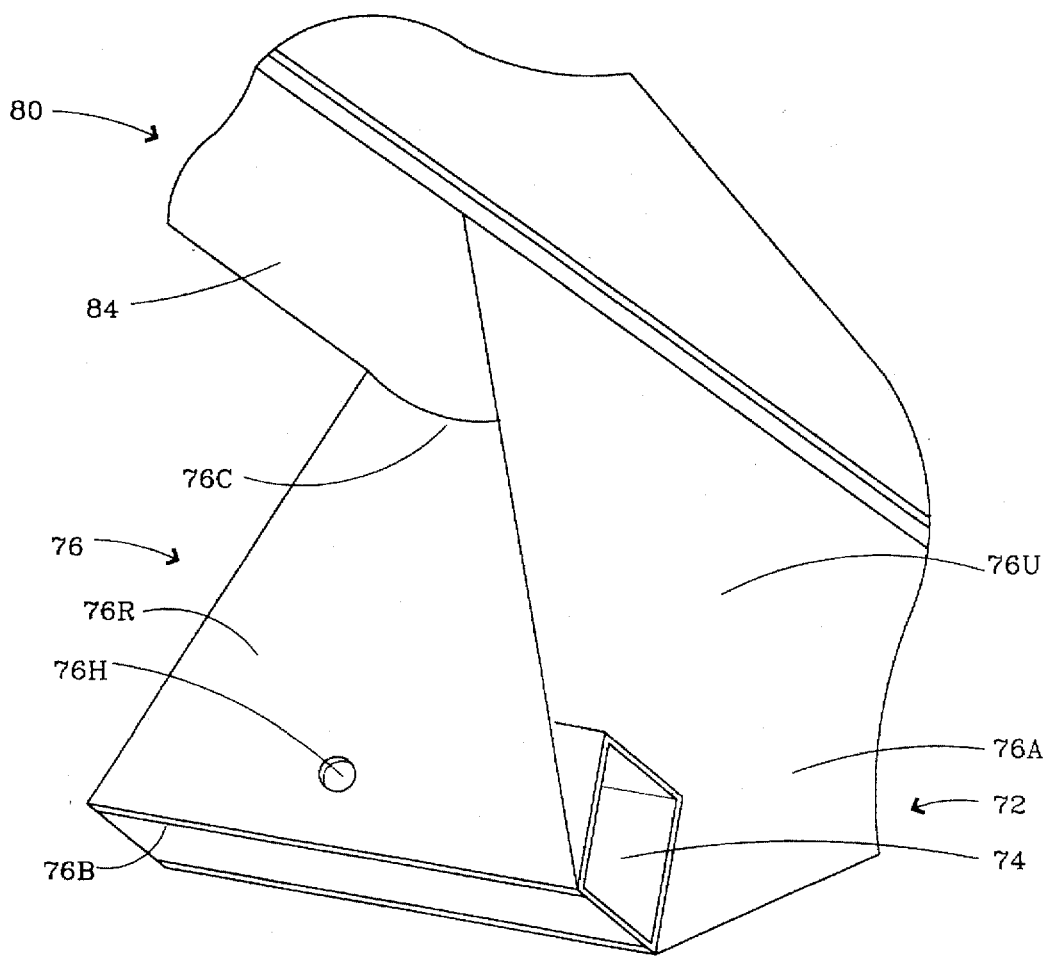
FIG. 7 is a perspective rear view of a gusset assembly forming part of the riser assembly, and adapted to receive the receiver insert tube of FIGS. 5 or 6.
Figure 7A:
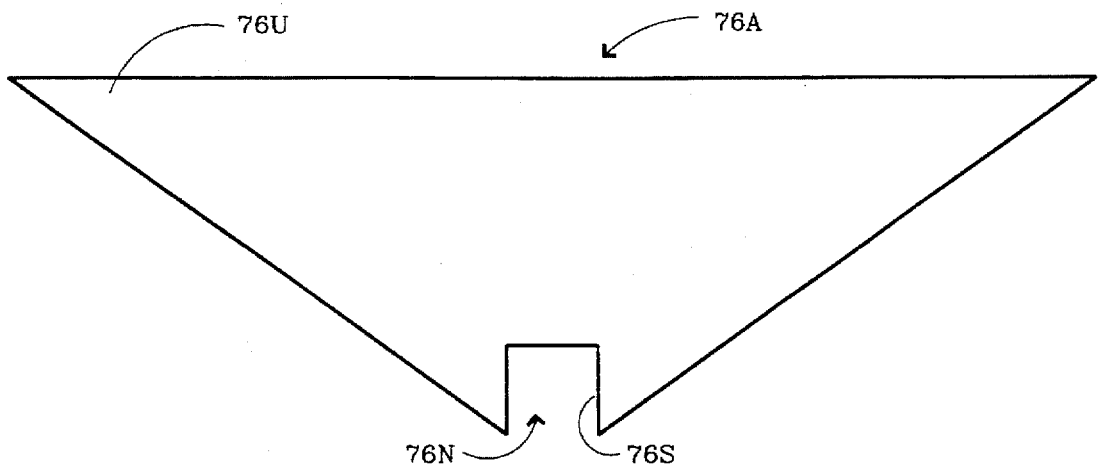
FIG. 7A is a rear elevational view of the rear gusset which forms part of the gusset assembly of FIGS. 1, 2, 4 and 7.

The riser assembly 70 includes a gusset assembly 72 (shown in FIG. 7) which is secured to a vehicle receiver hitch (not shown), and which includes a hollow elongated receiver tube 74, a plurality of vertical gussets that are collectively referred to by the reference numeral 76, and a riser beam assembly 80. The receiver tube 74 is hollow, tubular, and can have a square or rectangular cross-section. It is sized to receive, and to be adjustably secured to a hollow receiver insert tube 78 (shown in FIG. 5) or 78A (shown in FIG. 6), via a locking style hitch pin 74B (shown in FIGS. 1 through 4) inserted into corresponding holes 78B or 78C in the receiver insert tube 78 or 78A, as well as into holes 76H in the vertical gussets 76.

Figure 2:
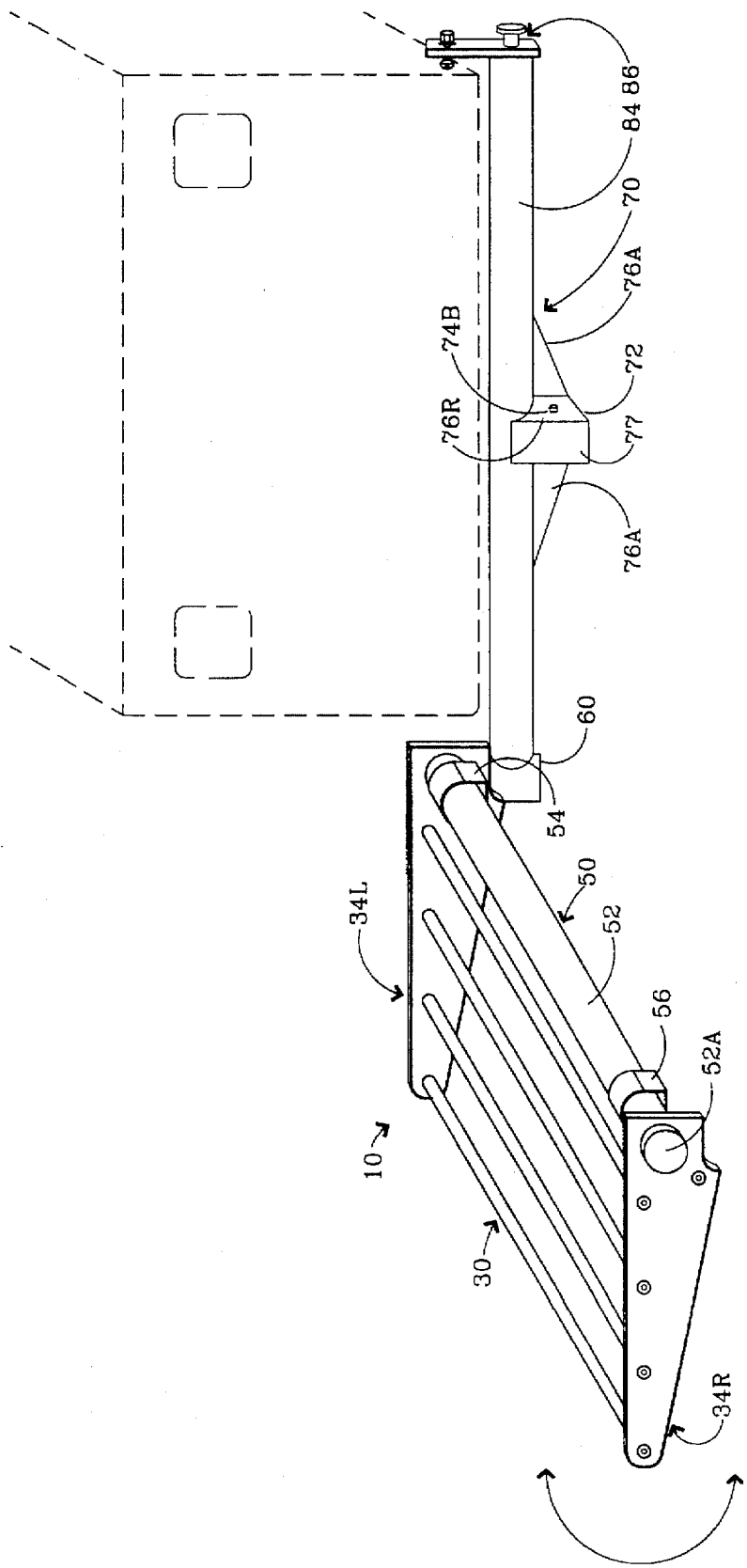
FIG. 2 is a front perspective view of the carrier of FIG. 1 shown in a fully extended, open horizontal position, away from the rear of the vehicle.
Figure 4:
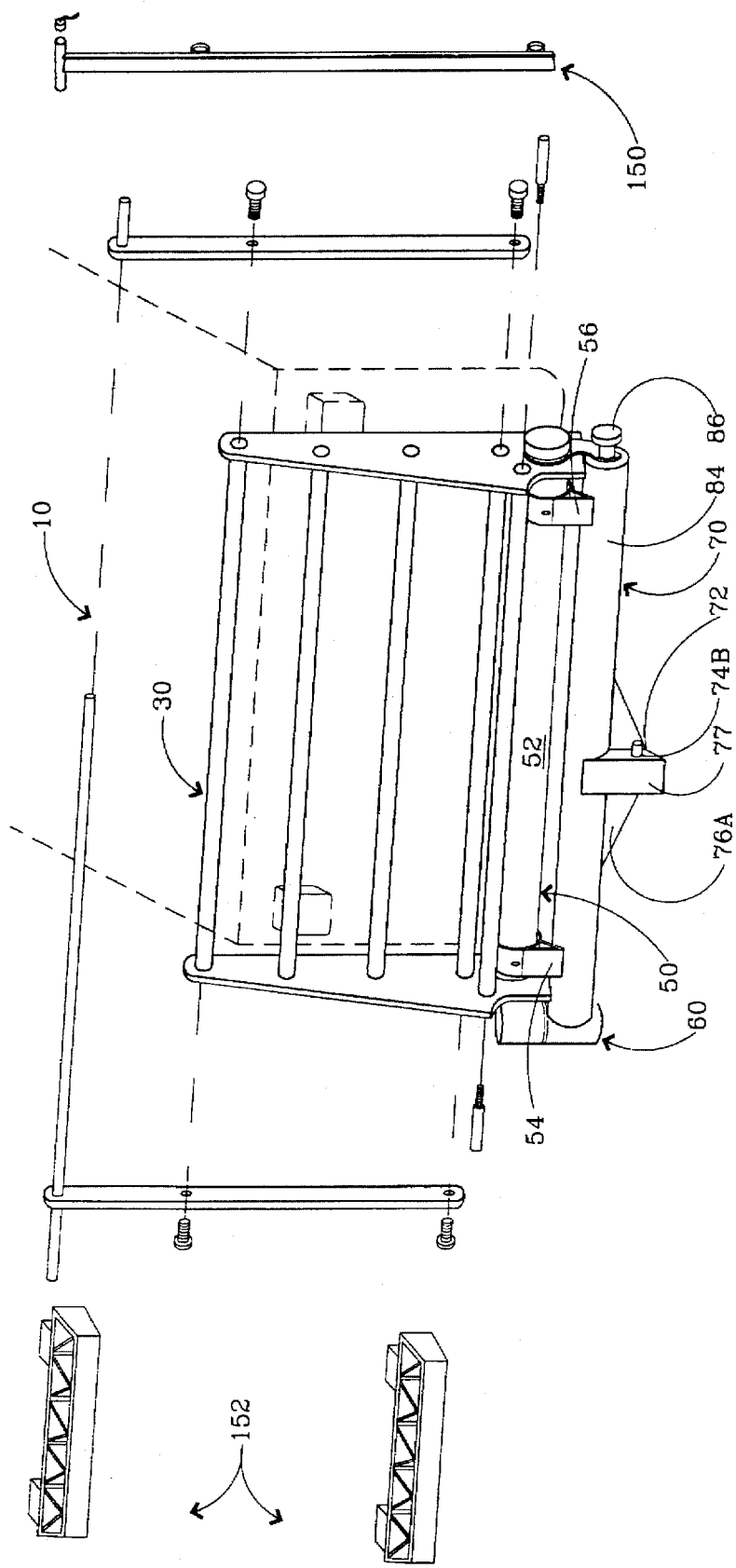
FIG. 4 is a front perspective view, showing partly exploded accessory mounts for mounting ski rack (left) and bicycle rack (right), illustrating the carrier of FIGS. 1 through 3 in an upright, fully closed vertical position.
Figure 8:
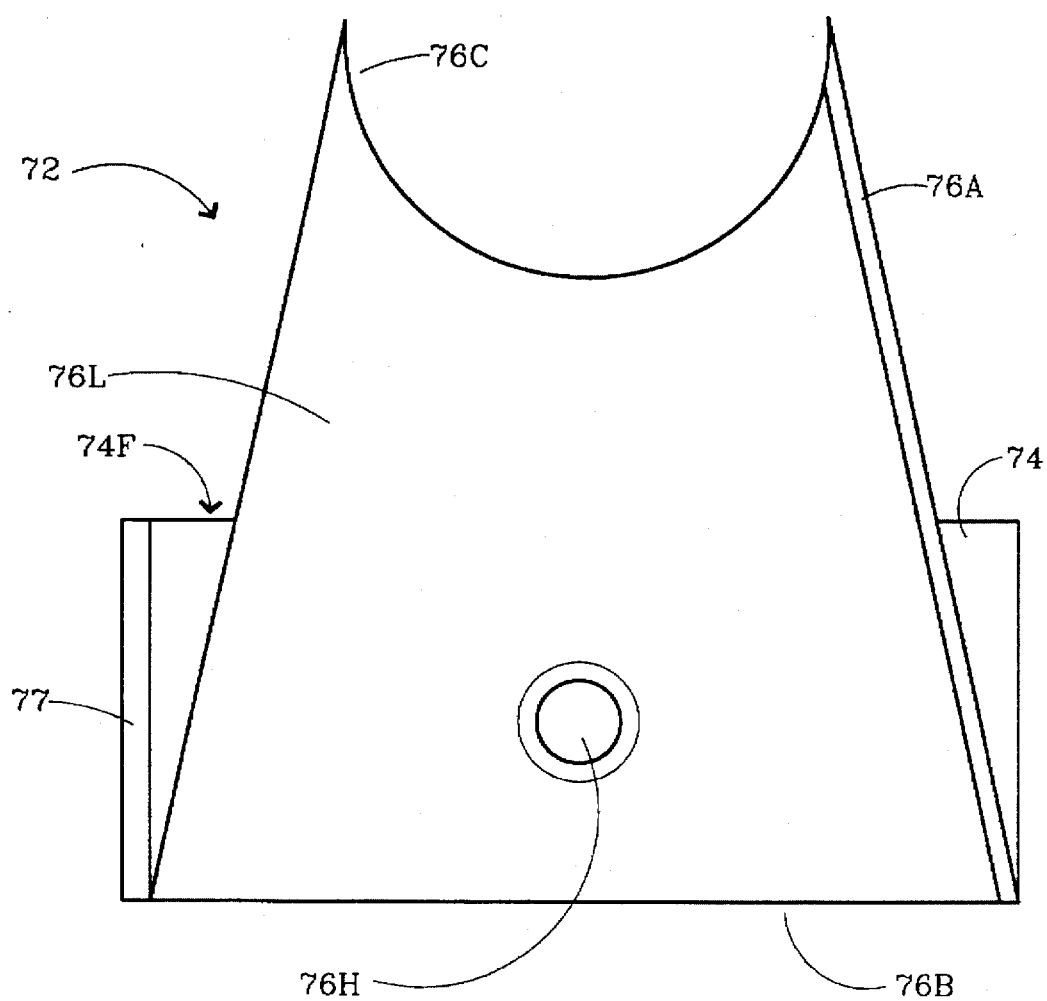
FIG. 8 is a side elevational view of the gusset assembly shown in part in FIGS. 1, 2, and 4, and all of FIG. 7.

Referring to FIGS. 2, 4, and 8, the vertical gussets 76 secure the gusset assembly 72 to the riser beam assembly 80, and include a left gusset 76L, a right gusset 76R, and a rear gusset 76A that are affixed together by means of conventional methods, such as by welding. The left gusset 76L and the right gusset 76R surround part of the receiver tube 74, and are affixed to the bottom, or center of the riser beam assembly 80.

The left and right vertical gusset 76L, 76R respectively, are generally identical, and therefore only the left vertical gusset 76L will be described in more detail with further reference to FIG. 1, 2 and 5 through 8. The left vertical gusset 76L is generally flat, and has a thickness of approximately ¼ inch. It has a straight bottom base 76B that is about 6 inches long, and an upper generally semi-circularity shaped collar 76C which is separated from the bottom base 76B by about 3 inches to 3.75 inches. The collar 76C is dimensioned to form a semi-circular notch for accepting a tube having an external diameter of 3 inches, such as the riser beam 84 which is a part of the riser beam assembly 80. The left and right vertical gusset 76L and 76R are mated and attached to the receiver tube 74, as explained above, by means of the locking style hitch pin 74B that is inserted into the holes 78B or 78C in the receiver insert tube 78 or 78A, and the holes 76H in the vertical left and right vertical gussets 76L and 76R. These holes 78B (or 78C), 76L and 76R are positioned in registration with each other so as to allow the pin 74B to be inserted therethrough.

The ability to manufacture the receiver insert tube 78, 78A to different lengths and the attachment of the receiver insert tube 78 or 78A to the gusset assembly 72 enables the carrier 10 to be adjusted closer or farther from the vehicle, in order to accommodate differences in vehicles, such as custom versus standard bumpers, and externally mounted spare tires, as were mentioned earlier. The carrier 10, which is formed of the platform assembly 30, door assembly 50, riser assembly 70 including the receiver insert tube 78 or 78A, is assembled as a single unit, and attached to the vehicle receiver hitch, via the receiver insert tube 78 or 78A being inserted into the vehicle's receiver hitch, thus enabling the carrier 10 to adapt to any type of vehicle, regardless of make, model or size.

Figure 7B:
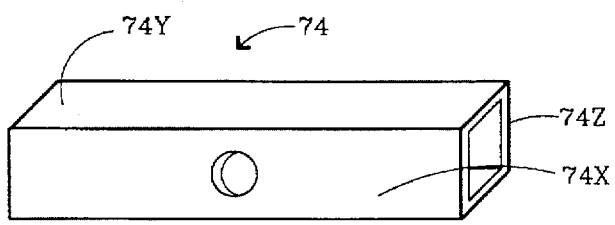
FIG. 7B is a side perspective view of the receiver tube which forms part of the gusset assembly in FIGS. 1, 2, 4 and 7.

As shown in FIGS. 2, 4, 7, 7A and 7B, the rear gusset 76A is generally flat and triangularly shaped, and is approximately ¼ inch thick. It includes an upper base 76U that is about 22½ inches long, and a square notch 76N with a dimension of 2½ inches, on each side, for receiving three external sides 74X, 74Y and 74Z of the receiver tube 74 (FIG. 7B). The rear gusset 76A is attached on the vehicle side of the gusset assembly 72. The gusset assembly 72 (FIG. 7) provides additional vertical ground clearance above and beyond the horizontal plane of the vehicle receiver hitch, and also eliminates the need for attachment to the bumper or bumper mounting brackets of the vehicle, and further improves user safety by raising the height of the load and minimizing the affects of lifting heavy objects from a low horizontal plane.

Referring to FIGS. 2, and 4 through 8, the receiver tube 74 is about 6 inches long and 2.5 inches square in cross section. The receiver tube 74, may optionally be capped, at its front end 74F, with a cap 77. At one end 79 (FIG. 5) or 79A (FIG. 6), the receiver insert tube 78 or 78A, respectively, fits inside the receiver tube 74, while at its other end 79B or 79C, respectively, it is secured to, and fits inside the vehicle receiver hitch (not shown). At its end 79 or 79A, the receiver insert tube 78 or 78A has a square external cross-section with a side dimension of 2 inches. The other end 79B or 79C of the receiver insert tube 78 or 78A is sized to selectively fit the square interior cross-section of the vehicle receiver hitch, for instance 2 inches or 1.25 inches, thus enabling the carrier 10 to adapt the two most commonly used receiver hitch sizes. Other hitch sizes can also be accommodated by modifying the dimensions and shape of the receiver insert tube 78 or 78A.

The receiver insert tube 78 or 78A (FIGS. 5 and 6) is about 16 inches long, and slides into the receiver tube 74 for the full length of the receiver tube 74, thus enabling ease of installation. As explained above, the locking style hitch pin 74B (FIGS. 1 through 4) passes through the transversely aligned pair of circular holes in the receiver tube 74, in the left and right vertical gussets 76L, 76R, and in the receiver insert tube 78 or 78A, ends 79 or 79A respectively, for enabling a safe and secure means of attachment. The opposite end 79B or 79C of the receiver insert tube 78 or 78A also has transversely aligned pair of holes 78B, 78C, respectively, which align with a pair of transversely aligned holes (not shown) in the vehicle receiver hitch and another locking style hitch pin 74B is passed through these transversely aligned holes, enabling simple, easy installation and removal of the carrier 10. The locking style hitch pins 74B provide a deterrent to the tempering or removal of the carrier 10 by a vandal.

Referring to FIGS. 1, 2, and 4, and 9 through 14 and 22, the riser beam assembly 80 will be described in greater detail. The riser beam assembly 80 generally includes two platform stops: a left platform stop 82L, and a right platform stop 82R; a riser beam 84; and a latch assembly 86. The riser beam 84 is attached at one of its ends to the latch assembly 86, for instance the right end as viewed in FIG. 1, in order to facilitate the opening, closing and securing of the door beam 52, which forms part of the door assembly 50, to the riser beam 84. The other opposing end of the riser beam 84 is attached to the door assembly 50, via hinge assembly 60 in order to rotate the door assembly 50 away from the vehicle so that rear access to the vehicle is unobstructed. The riser beam 84 is a hollow cylindrical tube that measures approximately 50½ inches in length. It has an external diameter of 3 inches, and is about ⅛ inch thick, prior to coping one of its ends to precisely mate the external diameter of hinge assembly 60, as shown in FIGS. 9 through 12 and 22.

Figure 9:
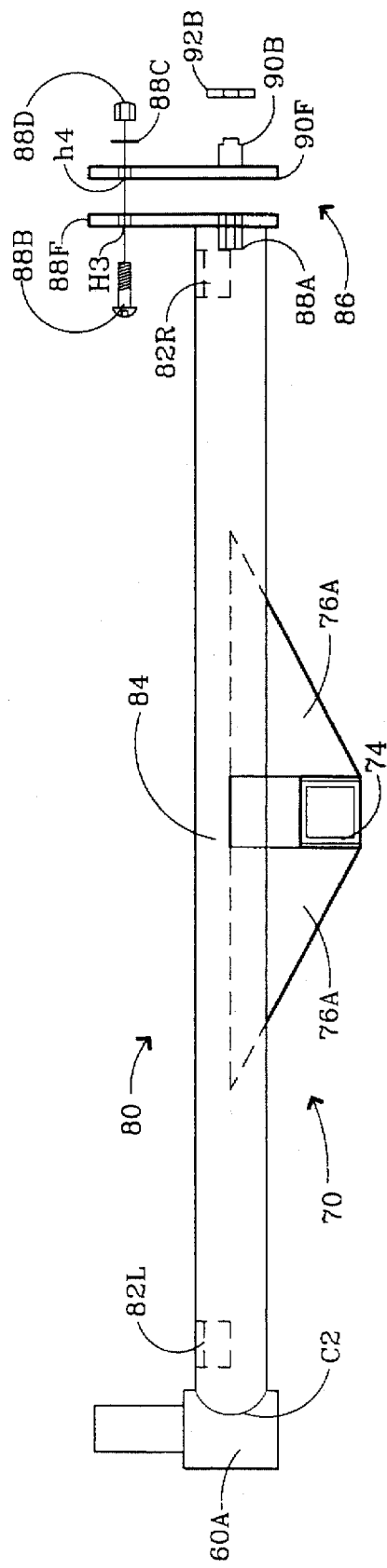
FIG. 9 is a front view of the assembled riser assembly of FIGS. 1, 2 and 4.
Figures 13, 14:
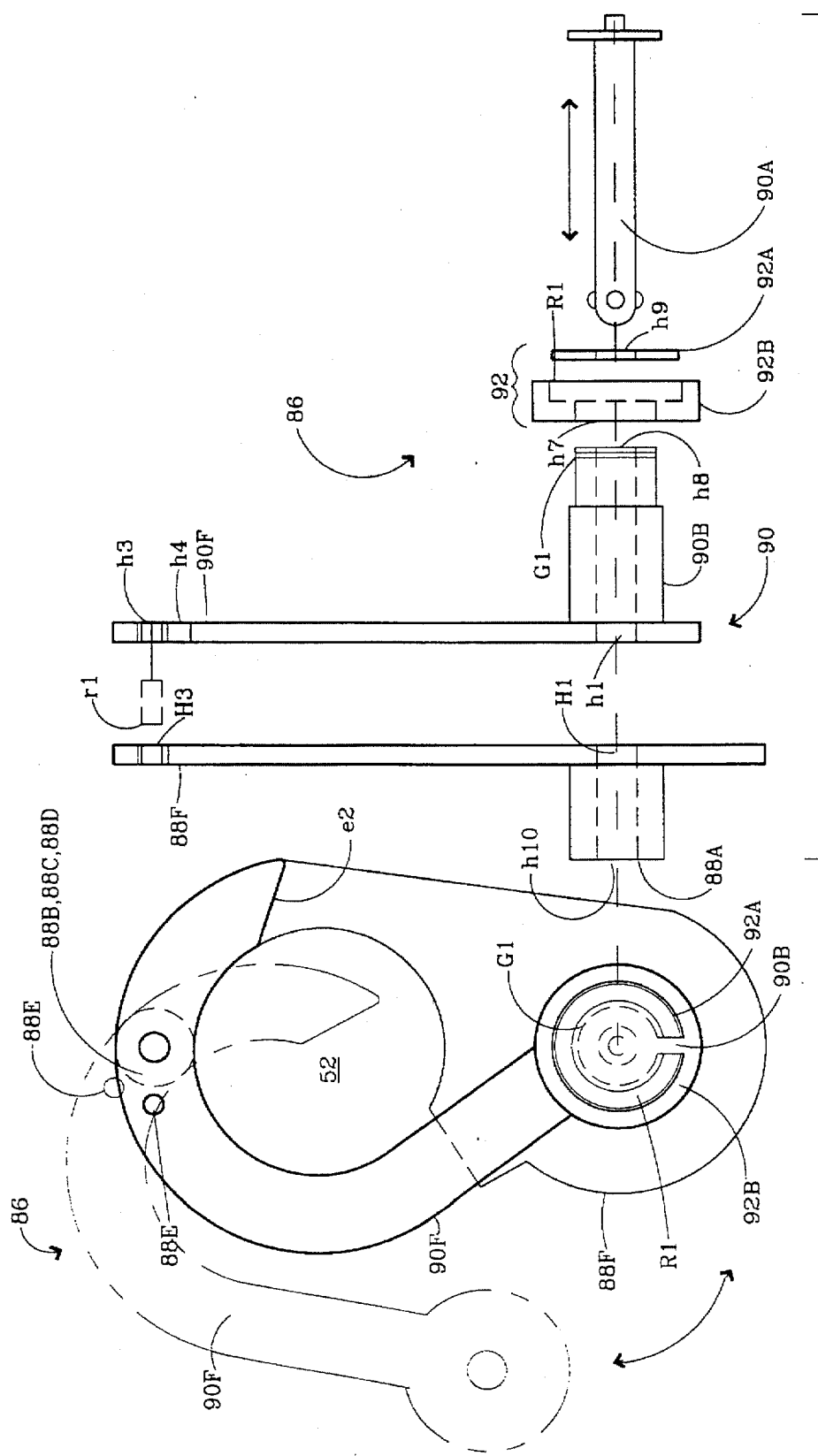
FIG. 13 is a side elevational view of a latch assembly which forms part of the riser assembly of FIGS. 9 through 12.
FIG. 14 is an exploded, front elevational view of the latch assembly of FIG. 13 and seen in part in FIG. 9.

The latch assembly 86 is partly shown in FIG. 9, and is further illustrated in more details in FIGS. 13, 13A, 13B and 14. It generally includes a cradle 88, an actuator crank 90, and a handle assembly 92. As seen in FIGS. 9 and 14, the cradle 88 is formed of a cradle base 88F, an inner spacer tube 88A, a machine bolt 88B, a washer 88C, a nut 88D and a stop pin 88E. The cradle base 88 is welded to one end of the riser beam 84.

The actuator crank 90 shown in FIGS. 13, 13A, 13B and 14, is formed of a quick release pin 90A, an outer spacer tube 90B, and a actuator base 90F. The actuator crank 90 is attached to the cradle base 88 by means of machine bolt 88B, measuring 1¼ inches long by ⅜ inches in diameter, ⅜ inch washer 88C and ⅜ inch locking style nut 88D. Machine bolt 88B is passed through hole H3 of the cradle base 88F, hole h4 of the actuator base 90F and washer 88C, and is tightened by nut 88D, to allow minimum wobble of the actuator base 90F, yet provide bind free rotation of the actuator base 90F around machine bolt 88B. As the actuator crank 90 has limited clockwise rotation by way of roll pin r1, when roll pin r1, measuring ½ inches in length by ¼ inches in diameter, is inserted flush into hole h3 on the handle assembly 92 side of actuator base 90F. This rotation limiting factor allows for unobstructed passage of the door beam 52 past the actuator crank 90 when the actuator crank 90 is rotated to its furthest most clockwise position.

Referring to FIG. 14, the handle 92 includes a snap ring 92A and a handle 92B. A snap ring 92A is inserted in a corresponding recess R1 within handle 92B, to fit a corresponding groove G1 on the outer spacer tube 90B, to hold handle 92B in place on the outer spacer tube 90B. The quick release pin 90A is inserted through co-aligning central holes in the snap ring 92A hole h9, the handle 92B hole h7, outer spacer tube 90B hole h8, actuator base 90F hole h1, cradle base 88F hole H1, and inner spacer tube 88A hole h10. This allows for the securing of the latch assembly 86 by means of the quick release pin 90A so that a user can secure the latch assembly 86 in a closed position and remove the quick release pin 90A to open the latch assembly 86, at the user's discretion.

Figure 13A:
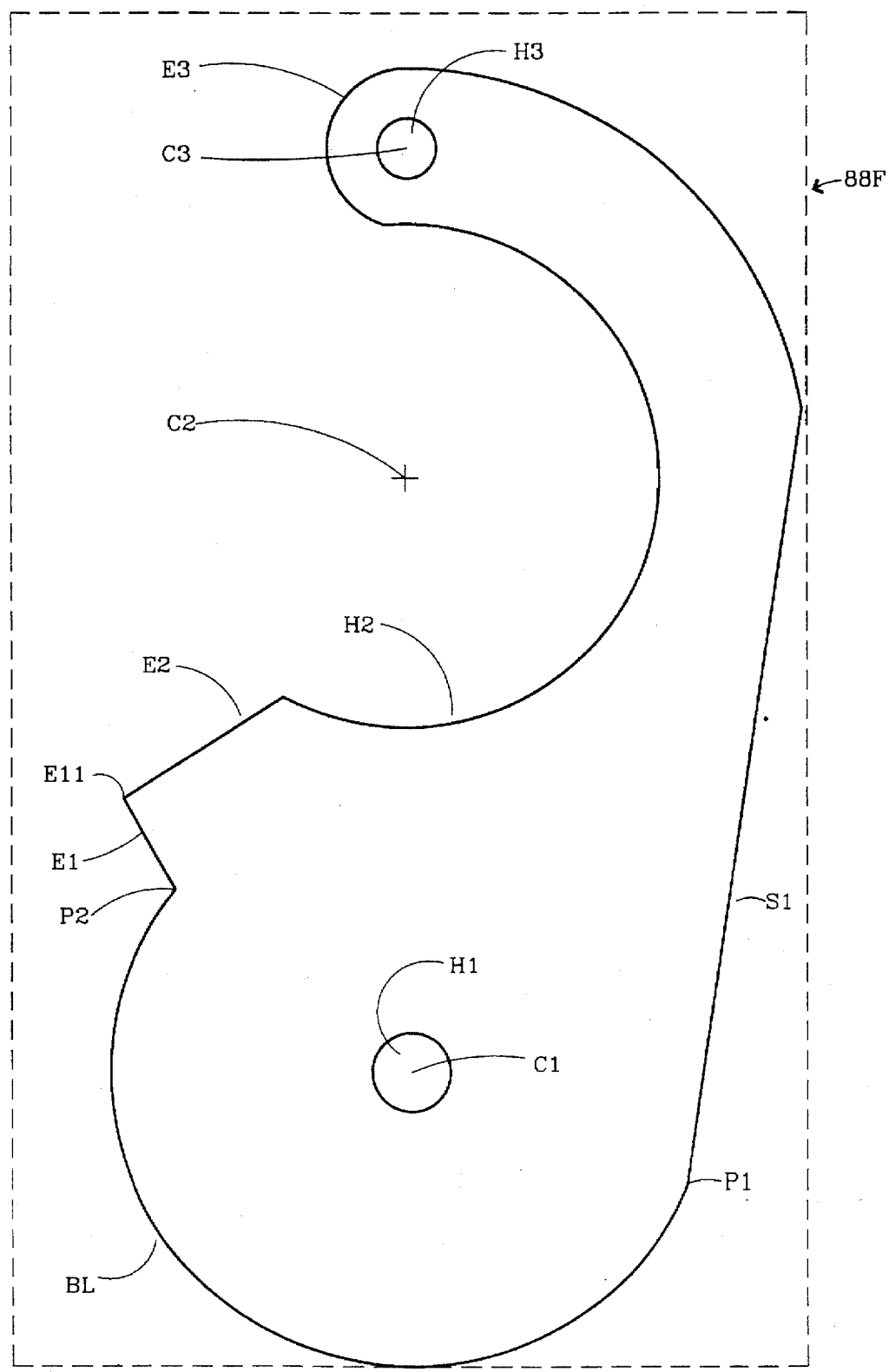
FIG. 13A is a side view of a cradle base which forms part of the latch assembly in FIGS. 13 and 14, and seen in part in FIGS. 9 and 10.
Figure 13B:
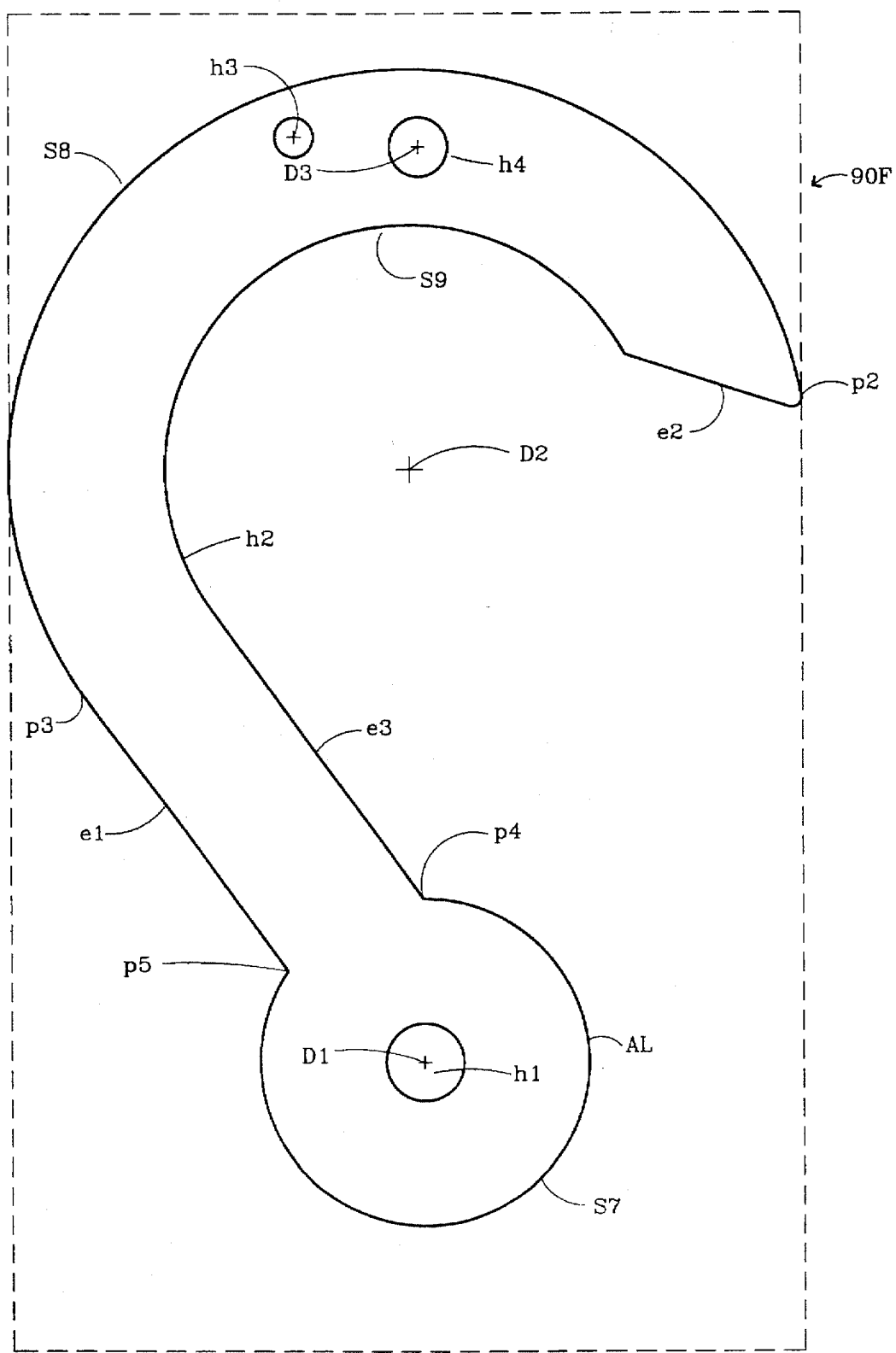
FIG. 13B is a side view of an actuator base which forms part of the latch assembly shown in FIG. 13, and seen in part in FIG. 9.

FIGS. 13 and 13A show that the cradle base 88F maybe fabricated from a rectangular flat steel plate, ¼ inch inches thick, and 8½ inches in length and 5 inches in width. With the plate (shown in dashed lines) in FIG. 13A, lying flat and with the width sides horizontal. Starting with the lower width side and using a scribing tool (i.e., marking pen), find the lower width's mid point at 2½ inches. Moving the scribing tool parallel to the 8 inch length for 1¾ inches, make a scribe point C1 at this location. Continuing along, parallel to the 8 inch length, make a second scribe point C2, 3¾ inches above the first scribe point C1. Continuing from the second scribe point C2, continue parallel with the 8 inch length, for 2 inches and make a third scribe point C3, such that the scribe points C1, C2 and C3 are generally co-aligned. At the first center point C1, scribe a radius circle 1¾ inches and bore a hole H1 at this scribe point ½ inches in diameter.

At the second scribe point C2, scribe two radius circles, one radius of 2½ inches and a second scribe of a radius of 1⁹⁄₁₆ inches. Bore a hole H2, at second scribe point C2, 3⅛ inches in diameter. To the right side of the plate, draw a straight edge scribe S1, from the outer diameter of the 2½ inch scribe to the outer diameter of the 1¾ inch scribe, at the farthest horizontal point of both scribes and remove this material.

Remove material from the 1¾ inch scribe, starting from the point P1, where the right straight edge S1 intersects the 1¾ scribe, clockwise to the six o'clock position of the 1¾ inch scribe, then continuing to remove material to a point P2 approximately 130 degrees from the six o'clock position, thus forming the straight edge side S1 and the cradle base 88F lower curvature BL. From point P2, remove material for ⅝ of an inch, cutting from right to left, on a 60 degree angle from horizontal of P2, thus forming straight edge E1 and point E11.

At point of E11, traveling left to right, make a cut, 35 degrees from horizontal of the point of E11, until this cut intersects the 3⅛ inch bored hole H2, thus forming a second straight edge E2. At the location of the third center point C3, scribe a counter clockwise radius circle of ½ inch from the twelve o'clock position of the 2½ inch radius scribe to the six o'clock position where the scribe intersects the 3⅛ inch bored hole H2, cut and remove this material, thus forming an asymmetrical "S" shaped edge E3. Bore a ⅜ diameter hole H3 at the third scribe point.

The actuator base 90F is fabricated using a rectangular steel flat plate, ¼ inch thick, 8½ inches in length by 5 inches in width. With the plate (shown in dashed lines) in FIG. 13B, lying flat and with the width sides horizontal. Starting with the lower width side and using a scribing tool, find the lower width's mid point at 2½ inches. Moving the scribing tool parallel with the 8 inch length for 1¾ inches, making a scribe point D1 at this location. Scribe a 1 inch radius circle S7 at this point and bore a ½ inch hole h1 at this scribe point D1 location. Continuing along the 8 inch length, scribe second point D2, 3¾ inches above the first scribe point D1. At the second scribe point D2, scribe two radius circles, one radius S8 of 2½ inches and the second radius S9 of 1⁹⁄₁₆ inches. Continuing parallel with the 8 inch length, from the second scribe point D2, continue for 2 inches and make a third center point D3, which is coaligned with the scribe points D1 and D2. Bore a hole h2, 3⅛ inches in diameter at the second scribe point D2, creating side S9, 3⅛ inches in diameter.

Traveling on a horizontal plane, parallel with the 5 inch with, from right to left bore a hole h3 ¼ inch in diameter, ¾ of an inch from the third center point D3. Starting at the twelve o'clock position p4 of the 1 inch radius circle scribe S7, cut and remove material along the scribe S7, traveling clockwise for 300 degrees, for defining an actuator base 90F lower curvature AL. From the 300 degree position, p5, scribe a straight edge e1, at 60 degrees of horizontal of p5, to the 2½ inch radius scribe S8, intersecting at p3. Cut and remove this material, from the 300 degree position on the 1 inch radius circle S7, traveling from right to left, along the straight edge scribe e1 to the intersecting point on the 2½ inch radius circle scribe S8. Continue to cut and remove material, in a clockwise direction from the intersecting point p3 of the straight edge scribe e1 and the 2½ inch radius scribe S8, for approximately 200 degrees, to point p2. From p2 position, traveling from right to left, on a horizontal plane with D2 and a parallel plane the 5 inch width, cut and remove material on a 25 degree angle to the intersection of the 3⅛ inch bored hole h2, creating edge e2.

Returning to the twelve o'clock position p4 of the 1 inch radius circle S7, from right to left from p4, at a 60 degree angle, from a horizontal plane, cut and remove material from the twelve o'clock position p4, to the intersecting point on the 3⅛ inch bored hole h2, creating e3. The edges e1 and e3 are substantially parallel and are distanced by about ⅞ of an inch.

Referring to FIGS. 9, 13, 13A, 13B and 14, the lower portion cradle base 88F, defined by lower curvature BL, is welded to the end of the riser beam 84 which was is not coped. The riser beam 84 measures 50 inches in length, 3 inches in diameter and has a wall thickness of ⅛ inch. The inner space tube 88A, measures 1¾ inch in length, 1 inch in diameter with a ½ inch bored hole h10. Hole h10, and hole H1 of the cradle base 88F are aligned and the inner spacer tube 88A is welded on its outside diameter, of one end to the cradle base 88F.

The actuator base 90F is curved and mounted in the opposite direction, to the curvature of the cradle base 88F to facilitate the removal of the door beam 52 when the actuator base 90F is rotated clockwise. In this respect, with reference to FIGS. 13, 13A, 13B, as the actuator base 90F is rotated clockwise around the machine bolt 88B that passes through holes H3 and h4, the edge e2 contacts door beam 52, and pushes against it, and leverages the door beam 52 out of the cradle base 88. FIG. 13 shows the actuator base 90F in a closed position (in solid line) and an open position (in dashed line). The actuator base 90F remains in the open position until it is engaged by the door beam 52, whereupon, the door beam 52 forces the edge e2 in a counter clockwise rotation around machine bolt 88B, causing the actuator crank 90 to return to a closed position, for insertion of the quick release pin 90A.

The actuator, crank 90 has an outer spacer tube 90B, identical to the inner spacer tube 88A. The outer spacer tube 90B also has been milled to a smaller diameter of ¾ of an inch for a distance of ¾ of an inch from the end that is not to be welded to the actuator base 90F. ⅛ of an inch from the end of the milled portion of the outer spacer tube 90B, a groove G1 is milled to match the fit a snap ring 92A. The hole h8 on the side opposite of groove G1, of the outer spacer tube 90B, is aligned with the hole h1 of the actuator base 90F and the outer spacer tube 90B is welded on its outside diameter to the actuator base 90F.

Referring to FIG. 14, the handle knob 92B, measuring 2 inches in diameter by ¾ inches thick, has a circular hole h7 in the center, measuring ¾ inches in diameter. A recess R1 is milled on one side of the handle knob 92B, measuring 1 inch in diameter for a depth of ¼ of an inch.

When latch assembly 86 is in a closed position, FIG. 13, the upper portion of the actuator base 90F and upper portion of the cradle base 88F have a circular interior cross-section, measuring 3⅛ inches in diameter, that is sized to fit the exterior cross-section of the door beam 52, measuring 3 inches in diameter.

Figure 10:
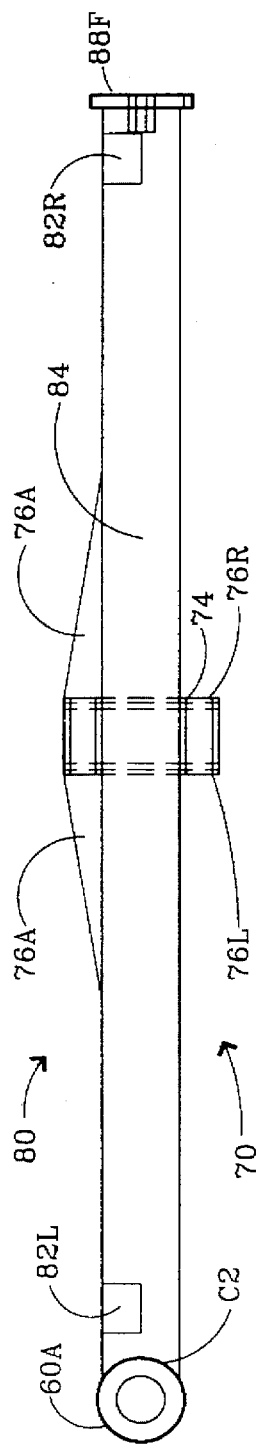
FIG. 10 is a top plan view of the assembled riser assembly of FIG. 9.
Figure 11:
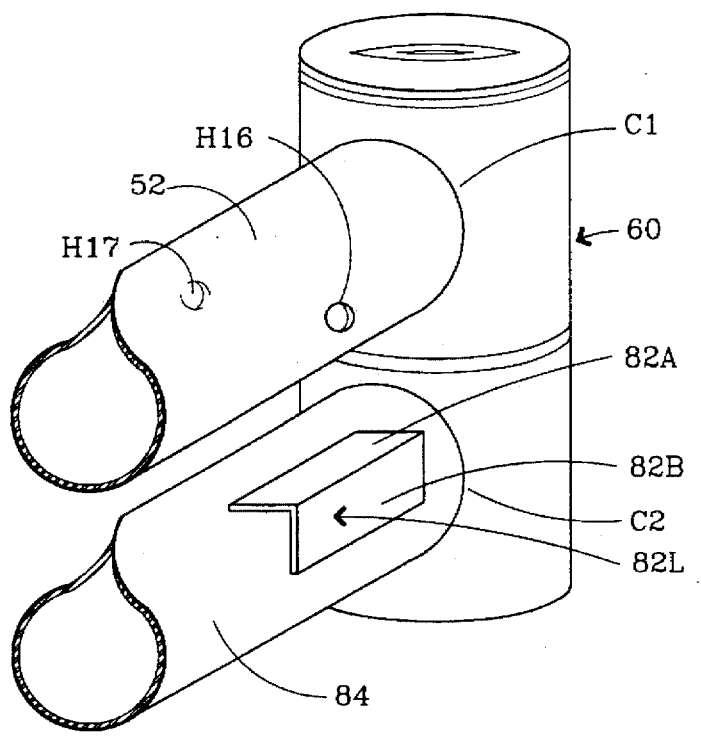
FIG. 11 is a perspective rear view of part of the riser assembly of FIGS. 9 and 10, and part of the door assembly.
Figure 15:
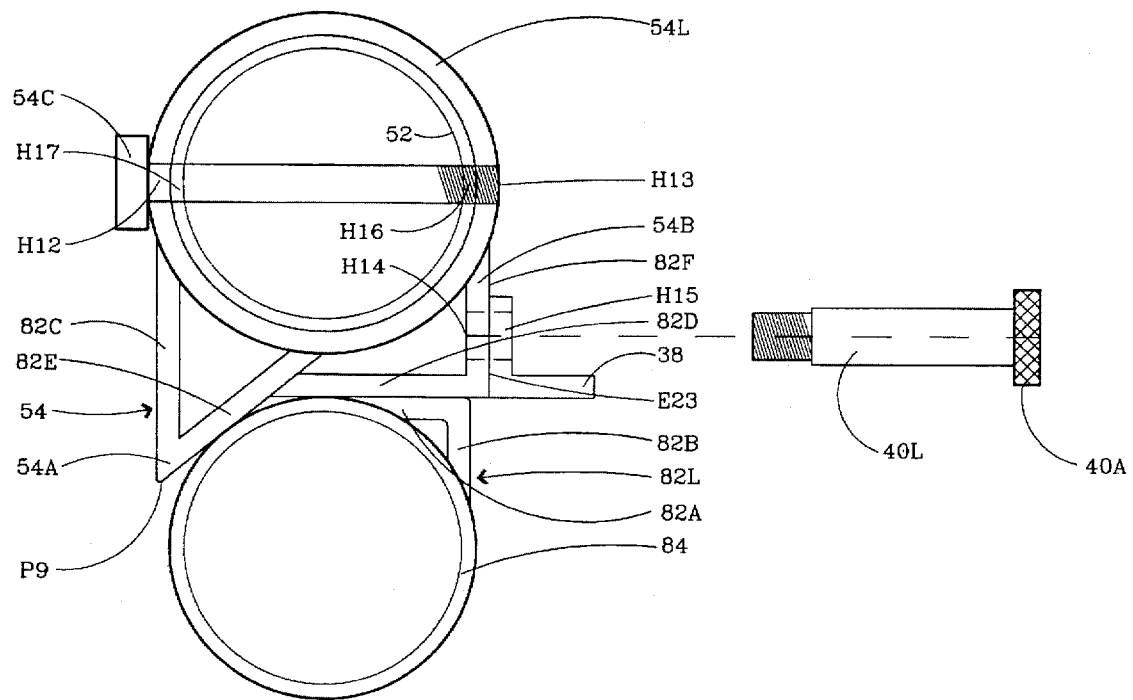
FIG. 15 is a side elevational view of a platform support sleeve and partially shown riser beam assembly, which forms part of the door assembly and riser assembly of FIGS. 11 and 12.

Referring to FIGS. 9, 10 and 15, the platform stops 82L and 82R that are positioned on the two opposite ends of the riser beam 84 are attached to the vehicle side of the riser beam 84 at about 23 inches from the center of the riser beam 84.

The stops 82L and 82R are identical in size, shape, and function, and therefore, only the stop 82L will be described in more detail. The stop 82L is approximately 3 inches long, and 3/16 inches thick, so that each side is 1 inch in width. It is formed of two sides 82A and 82B that are angularly (i.e., 90 degrees) secured to each other. One side 82A generally extends in a horizontal plane to form a platform for an edge 36G (FIG. 25) of the platform side plate 34L, so that when the platform assembly 30 is raised to a vertical position, as shown in FIG. 4, edge 36G mates with edge 82A and holds the platform assembly 30 in a stationary vertical position when the door assembly 50 is closed (FIG. 4). The platform side plate 34R is identical in size shape and function to platform side plate 34L.

Referring to FIG. 15, the end of the edge 82A of the platform stop 82L extends toward the vehicle, and is welded in place to the riser beam 84 at a point on the outer contour of riser beam 84. Accordingly, the end of edge 82B of the platform stop 82L will meet the riser beam 84 at a point 90 degrees from the end of the edge 82A where it has been welded to the riser beam 84. End of edge 82B is also welded to the riser beam 84.

The door assembly 50 will now be described with reference to FIGS. 1, 2, 4, 12 and 15 through 22. The door assembly 50 includes a door beam 52 with a door cap 52A, platform support sleeves 54 and 56, sleeve spacers 58L and 58R and hinge assembly 60.

Figure 12:
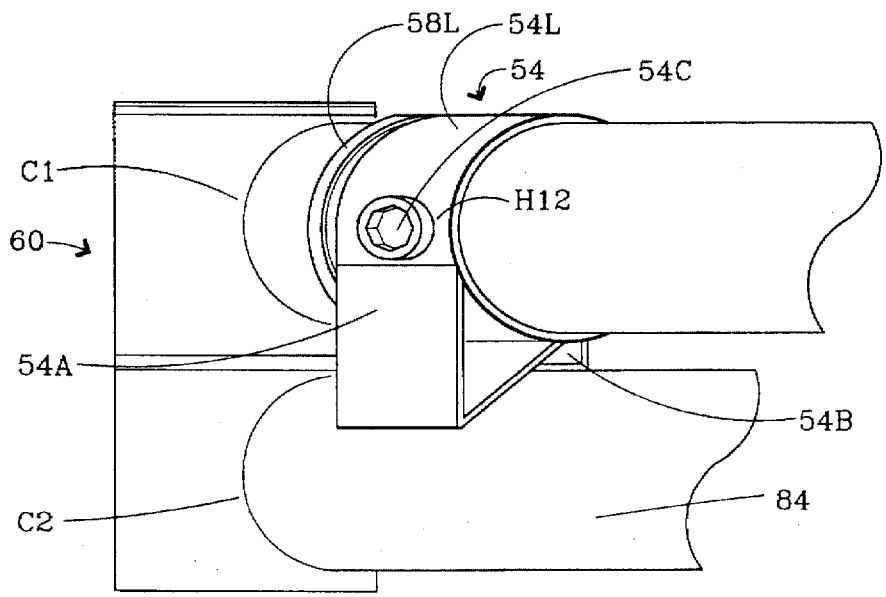
FIG. 12 is a perspective front view of part of the riser assembly of FIGS. 9 and 10, and part of the door assembly.

The hinge assembly 60 includes a hinge pivot 60A, hinge spacer 60B, door hinge tube 60C, flange bushing 60D, hinge cap 60E and tapered machine screw 60F. The identical platform support sleeves 54 (left) and 56 (right) include identical components including a sleeve 54L, 56R, front check 54A, 56A, rear check 54B, 56B, and sleeve bolts 54C, 56C, respectively. The door assembly 50 further includes a pair of identical sleeve spacers 58L, 58R (FIGS. 12, 18 and 19). For further illustration, only the left platform support sleeve 54 and the left sleeve spacer 58L will be described in detail.

Referring to FIGS. 3, 4, 12, 17, 18, 23 and 24, the sleeve spacers 58L have an internal diameter of 3 inches and a wall thickness of 3/16 of an inch. The width is sized to fit between the platform support sleeve 54 side S9 (FIGS. 1 through 4,12 and 17), and platform side plate 34L side S10 (FIG. 25). This enables the platform assembly 30 to remain in a fixed position, relative to the side to side movement on the door beam 52, as shown in FIG. 4. As a result, the platform assembly 30 is securely positioned on the door assembly 50.

Referring to FIGS. 1, 2, 9 through 12, 22 and 25, the door assembly 50 includes the hollow cylindrical door beam 52, measuring 50½ inches in length by 3 inches in diameter by ⅛ inch wall thickness. The door beam 52 may be covered at one open end with a door cap 52A, whose diameter is 2¾ inches by ⅛ wall thickness, and welded to this end. The door beam 52 may be coped C1, on a 1¹¹⁄₁₆ inch radius, at the opposite end from the door cap 52A mated to fit door hinge tube 60C. Also included are bored transverse holes H16 and H17 (FIGS. 11 and 15) ⅜ inches in diameter, positioned to coalign with bored holes H12, H13 as shown in FIG. 15. When the platform support sleeve 54 is fitted onto the door beam 52, with hole H13 closest to the vehicle, the sleeve bolt 54C passes through holes H12, H17, H16 and is screwed into hole H13, thus securing platform support sleeve 54 to door beam 52. The platform support sleeve 54 positions the platform assembly 30 on the door beam 52. It further supports the platform assembly 30 in a horizontal position, by way of front check 54A and lower tube 36E, when the door assembly 50 is in the open position (FIG. 2). It also holds the platform assembly 30 in a vertical position, by way of platform side plate 34L edge 36G and platform stop 82L edge 82A, when the door assembly 50 is in a closed position (FIG. 4). Moreover, as it will be explained later, the rear check 54B edge 82D acts as a physical contact surface between edge 82D and the platform stop 82L edge 82A, so when door assembly 50 is closed onto the riser assembly 70, with the latch assembly 86 in a locked position, the flexing of the door assembly is minimized.

With reference to FIGS. 11, 12 and 15 through 17, the platform support sleeve 54 has a 3 inch internal cross-section by 2 inches wide by ³⁄₁₆ inch wall thickness, to slide over the 3 inch external cross-section of the door beam 52. The platform support sleeve 54L is bored transversely through its diameter at mid point of its width, holes H12 and H13. Holes H12, H13 measure ⅜ inch in diameter. Hole H13 is tapped and is sized to fit the sleeve bolt 54C, which measures 3⅜ inches by ⅜ inches.

The left front check 54A includes an (end of) edge 82C that is welded to the sleeve 54L slightly below hole H12 and an (end of) edge 82E that is welded to the bottom contour of the sleeve 54L, at a point that is on a vertical center line of the sleeve 54L. The rear check 54B end of edge 82F is also welded to the sleeve 54L, slightly below the tapped hole H13 in the sleeve 54L. The rear check 54B is bent at a 90 degree angle toward edge 82E. The end of edge 82D is welded to edge 82E, thus providing ¾ of inch distance from the bottom of the door beam 52 to the top of the riser beam 84.

The front check 54A and the rear check 54B, have a width of 2 inches and a wall thickness of ³⁄₁₆ of an inch. The front check 54A end of edge 82C and the rear check 54B end of edge 82F, are welded on the left sleeve 54L in such a manner that it does not obstruct the passage of the sleeve bolt 54C through holes H12 and H13.

The front check 54A is bent at point P9, which is about 3¼ inches from the center line of hole H12, at approximately a 130 degree angle. The end of edge 82E is cut, material removed and welded in place on the outer contour of sleeve 54L, where it intersects the bottom of the sleeve 54L.

Figure 3:
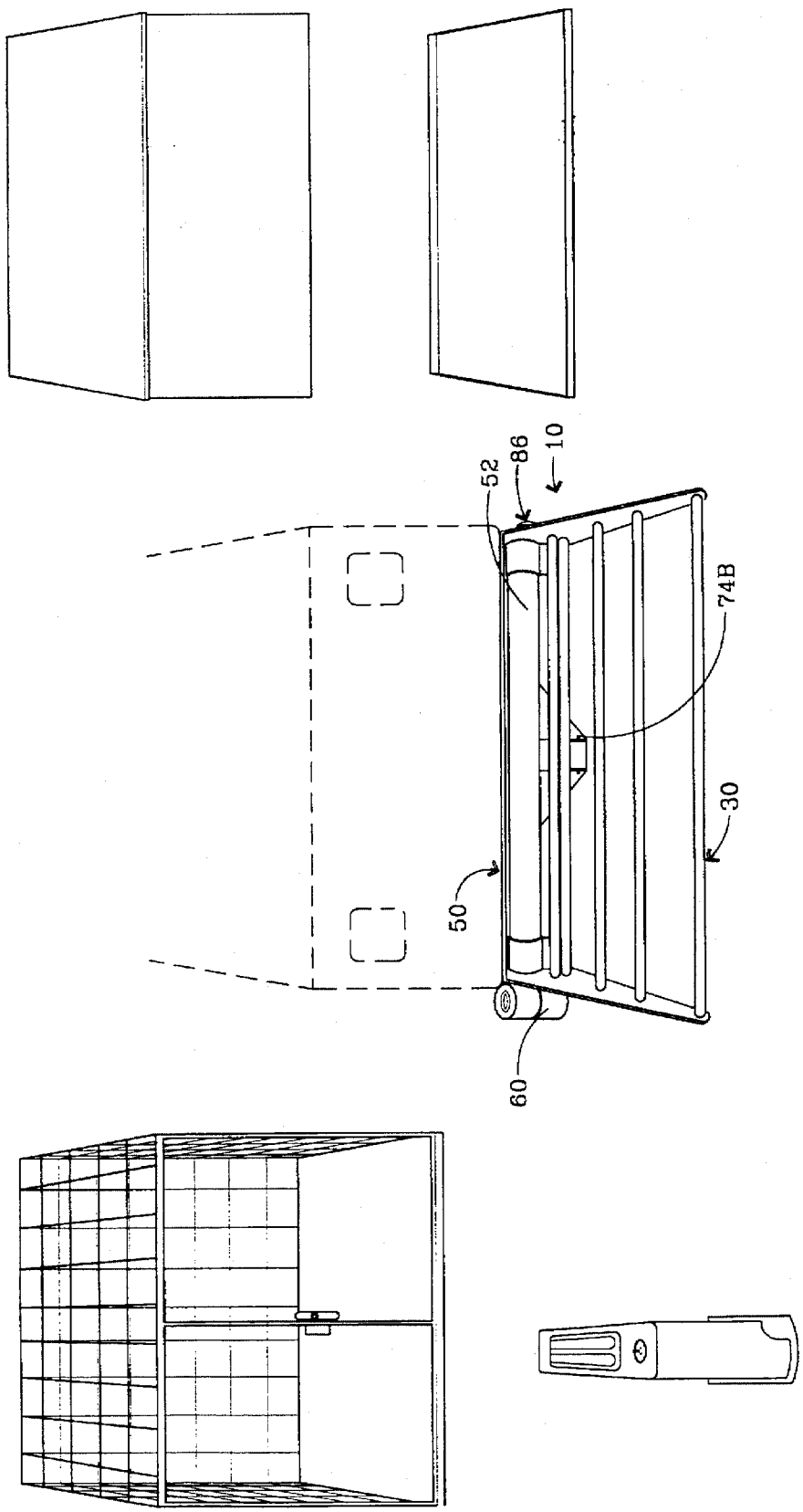
FIG. 3 is a front view of the carrier of FIGS. 1 and 2 shown in a fully extended, closed horizontal position, and ready to be loaded with a variety of accessories such as a cargo cage, a cargo chest and tray, and a gas can.

When the platform assembly 30 is in the horizontal position (FIGS. 2 and 3), the edge 82E comes in physical contact with the riser beam 84. This gives the door assembly 50 and riser assembly 70 the ability to support the weight of the platform assembly 30, and its cargo, regardless if the door assembly is in the open position or closed position (FIGS. 2 and 3). This is made to happen by means of the lower tube 36E coming in physical contact with edge 82C, and to be explained in further detail later. With particular reference to FIG. 3, the cargo may include, for instance, a cage 101, a gasoline can 102, a chest 103 and/or a base tray 104.

This is also the feature that allows the cargo to remain in place on the carrier 10 when the door assembly 50 is opened for an unobstructed access to the rear of the vehicle 12. Additionally, this feature also creates a second means of support of the platform assembly 30, on the door assembly 50, when the door is closed. The primary means of support of the platform assembly 30 on the door assembly 50, when the door assembly 50 is closed, will be discussed later.

Referring to FIG. 15, there is a ⅜ inch drilled and tapped circular hole H14, at mid point on edge 82F of the rear check 54B, which is made to accept knob bolt 40L, which is dimensioned 2½ inches in length by ⅜ inches in diameter. Another hole (not shown) that is identical in size, shape, function and construction, applies to the right rear check 56B.

Rear check 54B, when installed on the door beam 52, by way of being part of platform support sleeve 54, sized to match the positioning of the hole H15 in a platform brake 38 (FIGS. 15 and 23 through 25) that forms part of the platform assembly 30. The hole H15 is circular and is dimensioned to accept knob bolt 40L. Right knob bolt 40R is identical in size, shape, function and construction of left knob bolt 40L. Installation of the knob bolt 40L, through the platform brake 38 hole H15, and screwed into the rear check 54B hole H14, allows the platform assembly 30 to remain fixed in the vertical position, when the door assembly 50 is opened. Thus, providing the ability of the device to open and close without removing the carrier from the vehicle 12 for an unobstructed access of the vehicle 12 (FIG. 10).

Figure 22:
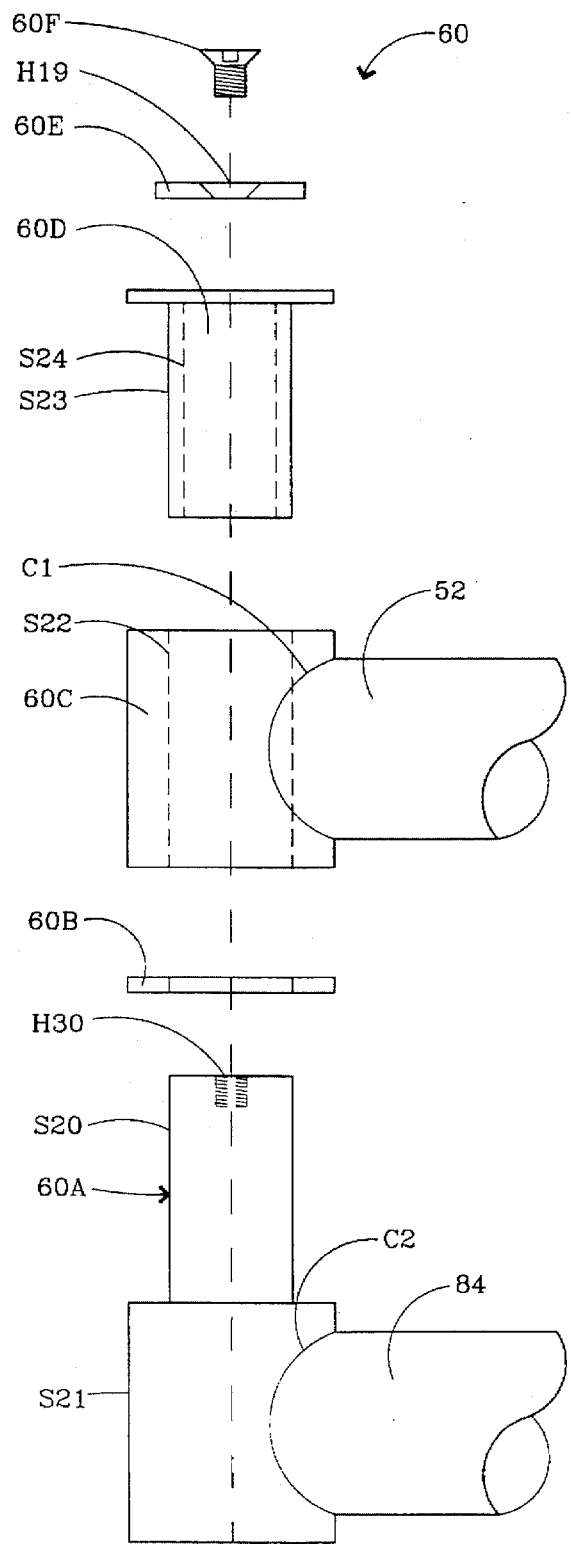
FIG. 22 is a exploded front elevational view of the hinge assembly which forms part of the door assembly and riser assembly of FIGS. 1, 2, 3, 4, 11 and 12.

The door assembly 50 also includes a hinge assembly 60. As illustrated in FIG. 22, the hinge assembly 60 includes a hinge pivot 60A, a hinge spacer 60B, a door hinge tube 60C, a flanged bushing 60D, a hinge cap 60E and a tapered machine screw 60F.

The riser beam 84 is coped C2 (FIGS. 9 through 12 and 22) in a similar fashion as was described earlier for C1, on the end opposite the latch assembly 86, to mate a solid cylindrical bar, 7⁵⁄₁₆ inches long by 3⅜ inches in diameter, which once machined becomes hinge pivot 60A. The machined portion S20 of solid cylindrical bar measures 4¹⁄₁₆ inch in length by 2 inches in diameter. Centered in the cross-section of the 2 inch machined portion S20, of the hinge pivot 60A, a hole H30 is bored and tapped and sized to fit the threads of the tapered machine screw 60F, measuring ¾ inch long by ⁷⁄₁₆ inch diameter. The section of the hinge pivot 60A that was not machined S21, measures 3¼ inches long by 3⅜ inches in diameter, is centered to and welded to the coped end C2 of the riser beam 84 (FIGS. 9–11 and 22). The door hinge tube 60C, measuring 3¼ inches long by 3⅜ inches in diameter by 2⅜ inch internal diameter is cut to length. The door beam 52 having been coped C1, is centered and welded to the door hinge tube 60C at C1 (FIGS. 9–11 and 22). To the opposite end of the door beam 52, the door cap 52A, measuring 3⅛ inches in diameter by ⅛ inch wall, is centered and welded to the door beam 52, as described earlier. The hinge spacer 60B, measures 3⅜ inch external diameter by 2 inches internal diameter by ⅝ inch thickness, is made from oil impregnated bronze. The flanged bushing 60D, also made from oil impregnated bronze, has an internal diameter S24, measured to fit the 2 inch diameter S20 of the hinge pivot 60A, and outer diameter S23 of flanged bushing 60D is sized to fit the 2⅜ inch internal diameter S22 of the door hinge tube 60C. The flanged bushing 60D length is 3¼ inches and whose flange has an outer diameter of 3⅜ inches and a thickness of ¼ inch.

The hinge cap 60E measures 3⅜ inches in diameter by ¼ inch thickness. A circular hole H19 is bored through the center of the diameter of the hinge cap 60E, and is sized to fit the external diameter of the tapered machine screw 60F. The hole H19 is counter sunk sized to fit the taper, of the tapered machine screw 60F. A tapered machine screw 60F is sized at ¾ inches long by ⁷⁄₁₆ inches in diameter, to fit the threaded hole H30 in the hinge pivot 60A.

With the door hinge tube 60C attached to the door beam 52, the flanged bushing 60D is inserted into the door hinge tube 60C, as illustrated in FIG. 22. With the hinge pivot 60A attached to the riser beam 84, the hinge spacer 60B is inserted onto the hinge pivot 60A, and door hinge tube 60C is inserted onto the hinge pivot 60A. The hinge cap 60E is installed on the hinge pivot 60A, encapsulating the entire assembly, and finally, the insertion of the tapered machine screw 60F through the hole H19 in the hinge cap 60E and tightened into hole H30, completes the assembly process. This enables the user, smooth, reliable performance of the hinge assembly 60 for an unobstructed access of the rear of the vehicle, while providing a safe and secure means of attachment of the door assembly 50 to the riser assembly 70.

The platform assembly 30 will now be described with reference to FIGS. 15, 20, 21 and 23 through 25. The platform assembly 30 includes a left side plate 34L and right side plate 34R, side plate connecting tubes 36A, 36B, 36C, 36D and 36E, platform brake 38, and knob bolts 40L, 40R. All left and right components are identical in size, shape, function and construction. For this discussion the left side will be discussed.

The side plate 34L is a flat plate, resembling a right-angled triangle, measuring about 25¾ inches in length by 6⅝ inches in width (at its widest point) and ½ inch in thickness.

A plurality of hollow, cylindrical, rigid tubes, 49 inches in length by 1⅛ inches in diameter interconnect the left and right side plates, 34L and 34R. The side plate connecting tubes 36A, 36B, 36C, 36D and 36E, are welded in place after insertion into holes H40/h40, H41/h41, H42/h42, H43/h43 and H44/h44, as well as the aluminum platform brake 38.

The platform brake 38, measures 48 inches in length, shaped as an "angle iron". It has sides of equal dimension and perpendicular to each other, forming a right angle of 1 inch (side E21) by 1 inch (side E22) by ¼ inches thick. The platform brake 38 is attached to the side plates 34L, 34R at points p20 and p21, so that the edge 36I is parallel to and flush with edge 36G, and the inside edge E21, of the platform brake 38 is parallel to edge 36H, and edge E20 is flush with edge 36H. In this position, the ends of the platform brake 38, where contacting S10 and S11 are welded to side plates 34L and 34R.

Figure 23:
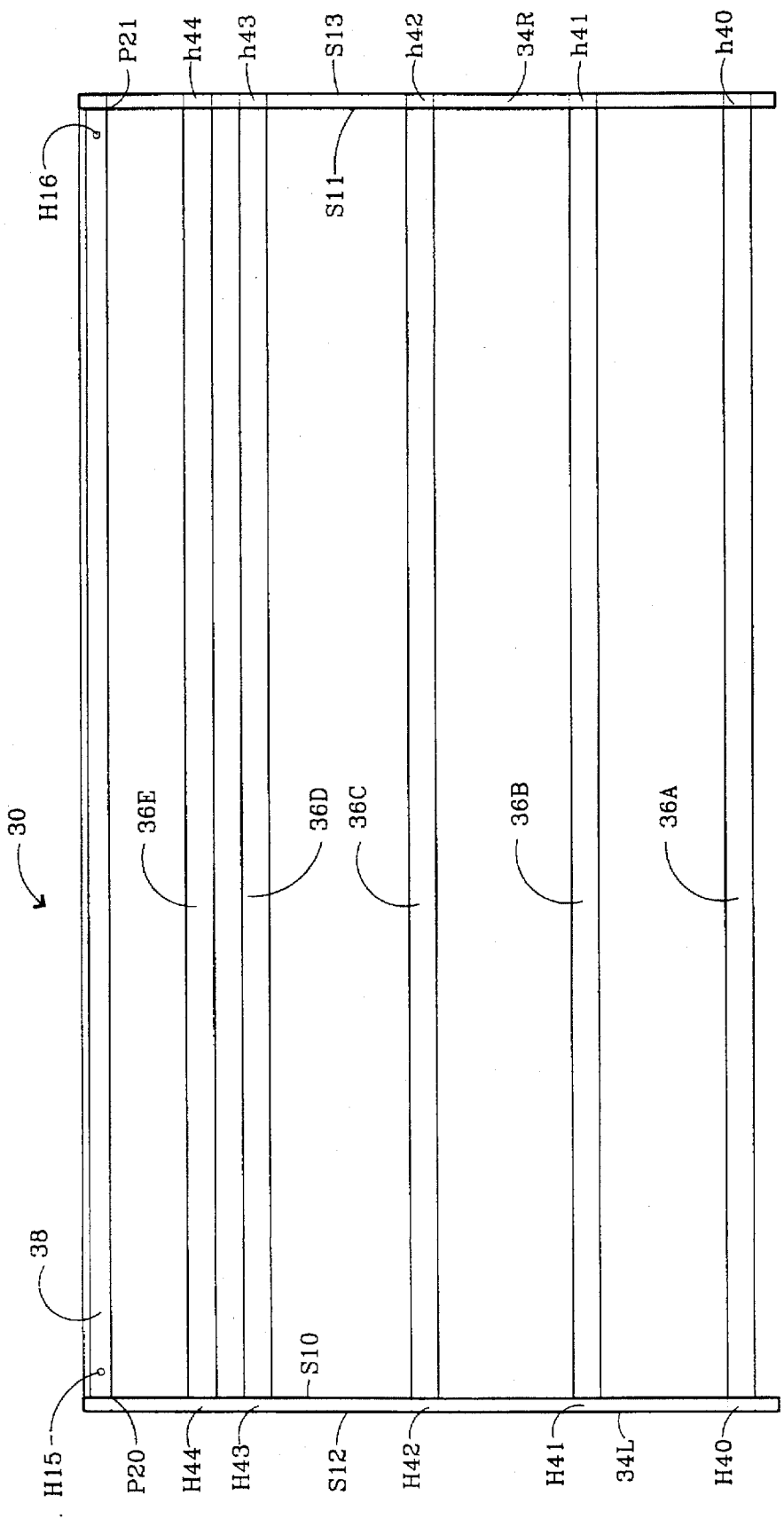
FIG. 23 is a top view of a platform assembly which forms part of carrier 10 of FIGS. 1, 2, 3 and 4.

Referring to FIGS. 15, 23 and 25, holes H15 and H16 are made by drilling two ⅜ inch holes at the locations, 1 inch from the side S10 and S11, and in the center line of the width of edge E21. Holes H15 will coalign with threaded hole H14 on rear check 82F, to accept insertion of knob bolt 40L, (right side not shown, but identical in size, shape, function and construction).

The knob bolt 40L (right side not shown) is inserted through the platform brake 38 hole H15 of the platform brake 38, and threaded into the rear check 54B hole H14, enabling the platform assembly 30 to remain in a vertical position when the door assembly 50 is opened (FIG. 1), and provides simple and easy use of hardware that is commonly used by the lay person, by way of the knurled end 40A of the knob bolt 40L.

Figure 24:
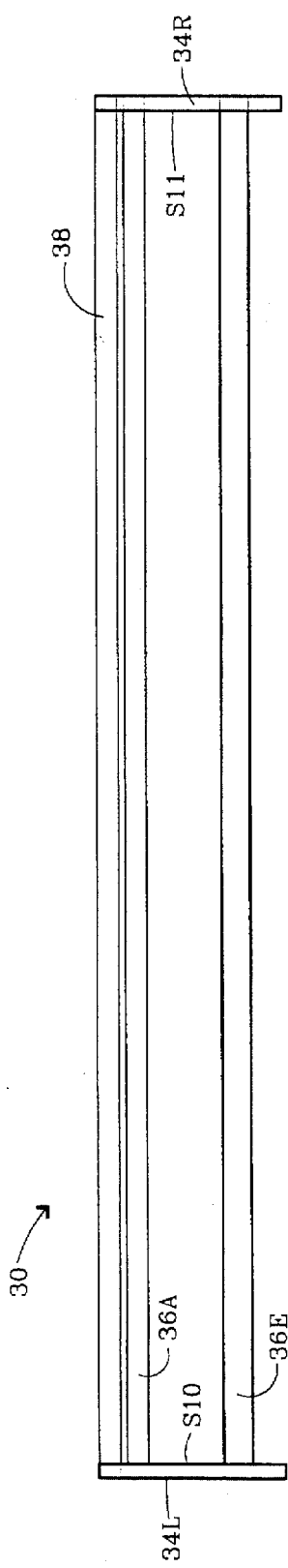
FIG. 24 is a front view of a platform assembly which forms part of carrier 10 of FIGS. 1, 2, 3, 4, and all of FIG. 23.
Figure 25:
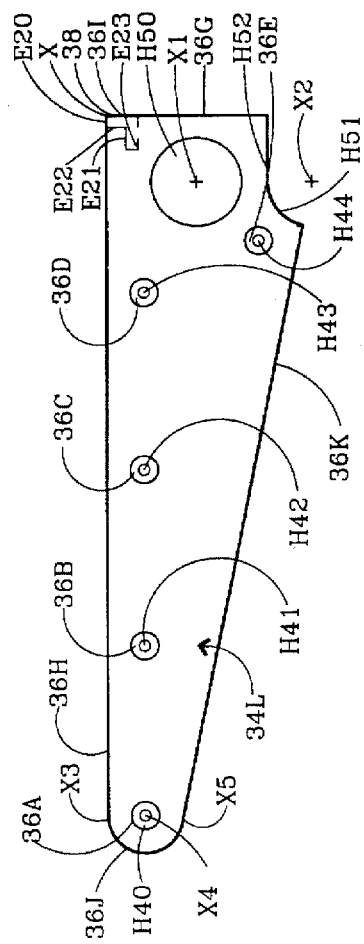
FIG. 25 is a side view of a platform assembly which forms part of carrier 10 of FIGS. 1, 2, 3, 4, and all of FIGS. 23 and 24.

Referring to FIGS. 23 through 25, four circular holes H40, H41, H42, and H43 (right side not discussed), each mea-suring 1⅛ inches in diameter, are made through the side plate 34L and 34R, 6 inches on center starting from edge E22 of platform brake 38 (FIG. 25) and 1⁹⁄₁₆ inches from the edge 36H to the center of the hole H40, H41, H42 and H43.

Referring to FIGS. 23 and 25, position of hole H44 is determined after the platform assembly 30 is attached to the door assembly 50, in the horizontal position (FIG. 3), and with the latch assembly 86 closed and locked by quick release pin 90A (FIG. 14). Scribe a hole H44, 1⅛ inches in diameter, on side plate 34L side S10 so that the scribe mark should come in contact with front check 54A edge 82C (FIGS. 12, 15 and 16). A 1⅛ inch diameter hole H44 is then made and lower tube 36E is inserted in hole H44 and welded. Observe if the lower tube 36E is in contact with the front check 54A edge 82C at the same time as hole H51 on side plate 34L is in physical contact with the outer contour of the riser beam 84, as seen in FIG. 3. When the platform assembly 30 and the door assembly 50 is opened, (FIG. 2) H51 (FIG. 25) will disengage from the outer contour of the riser beam 84, and the platform assembly 30 will "drop" until the lower tube 36E comes in physical contact with the front check 54A edge 82C. There should be simultaneous contact of lower tube 36E with front check 54A edge 82C when H51 is in contact with the outer contour of riser beam 84, when the platform assembly 30 and the door assembly 50 are closed (FIG. 3) and the latch assembly 86 (FIG. 13) is closed and locked with quick release pin 90A.

All the side plate connecting tubes 36A, 36B, 36C, 36D and 36E can be tapped in the ends of their internal diameter to accept the thread of a ⅝ inch bolt, for attaching a number of accessory mounts, such as accessory mounts for bike racks 150, ski racks 152, gas cans, carrying cage, cargo chest, carrying tray, fishing poles, snow board, surf board, wheel chair, tool chest, mobile cook top oven, ice chest, lawn mower, to name a few (shown in exploded view in FIG. 4).

Referring to FIG. 25, begin with a flat rectangular aluminum sheet 26 inches in length by 8 inches in width by ½ inches thick, lying flat with the length sides horizontal, using a scribe tool, the top horizontal side becomes edge 36H of the side plate 34L and the right edge becomes edge 36G. From point X, traveling along side 36H for 24 inches, scribe a point X3, then traveling perpendicular to side 36H for 1⁹⁄₁₆ inches, mark a scribe point X4. Scribe a line from X3 through X4 for 5 inches. From X4, scribe a counter clockwise 1⁹⁄₁₆ inch radius circle 36J, starting at X3, until it intersects the scribe line from X3 through X4 for 5 inches, this intersecting point becomes X5.

Starting at point X, traveling horizontally 2¼ inches, from right to left along side 36H, and then proceeding 2¾ inches parallel with side 36G, make a mark X1 and scribe and bore a hole H50 3.005 inches in diameter. Continuing, travel 2¼ inches from point X1, parallel with side 36G, and scribe a point X2. Scribe a line from point X1 to point X2 and scribe a line from point X5 to X2. At point X2, scribe and bore a hole H51 3.005 inches in diameter. Cut and remove material along scribes 36J and 36K. Traveling from left to right, parallel to side 36H, from the intersection point of H51 and the scribe line from X1 to X2, cut and remove material along this line to side 36G, creating side H52. The bottom of circular hole H50 and the top of circular hole H51 at side H52, should be distanced apart by about ¾ inch.

With the platform assembly 30 installed to the door assembly 50, hinge assembly 60 and riser assembly 70, as a complete unit, and with the latch assembly 86 in a closed position, the circular hole H50 and the circular hole H51 are also positioned to fit, relative to the side 36G, so when the platform assembly 30 is raised into the vertical position on the door beam 52, the side 36G (FIG. 25) makes physical contact with edge 82A of the platform stop 82L (FIG. 15). The rear check 54B, edge 82F (FIG. 15) makes physical contact with edge E23 (FIG. 25), of the platform brake 38 and hole H14 of the rear check 54B coaligns with the hole H15 of the platform brake 38, allowing for the insertion and securing of knob bolt 40L, through hole H15 and tightened into hole H14. Both of these features further support the platform assembly 30 in a securely fixed and vertical position when the platform assembly 30 and door assembly 50 are in an open or closed position on the riser assembly 70.

Refer to FIGS. 2, 3 and 25. With the platform assembly 30 installed to the door assembly 50, hinge assembly 60 and riser assembly 70, as a complete unit, the circular hole H50 and the circular hole H51 are also positioned to fit, relative to the door beam 52 and the riser beam 84. When the latch assembly 86 in the closed position, the remaining portion of the circular hole H51 rests upon the outer contour of riser beam 84 for maintaining the platform assembly 30 in a horizontal position. This is the primary means of support for the platform assembly 30 when the door assembly is closed. This innovative use of circular holes H50 and H51 enable the platform assembly 30 to be supported by the door beam 52 and the riser beam 84, together, when the carrier 10 is in a closed position. This design provides a safe and secure means of transporting cargo under dynamic conditions as the vehicle is traveling under the normal conditions and speeds that exist on our roadways today.

Figure 26:
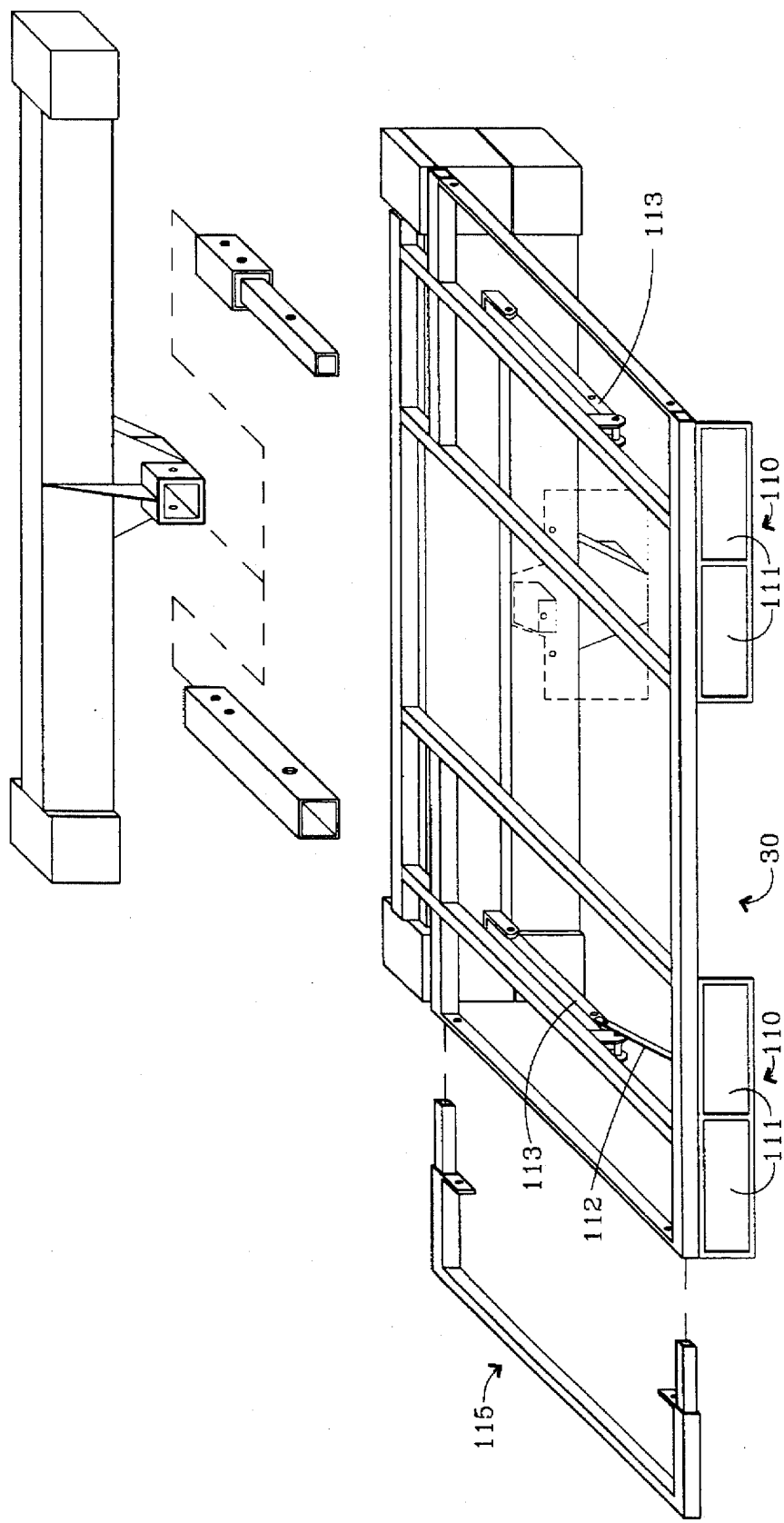
FIG. 26 is an exploded view of another embodiment according to the present invention.
Figure 27A:
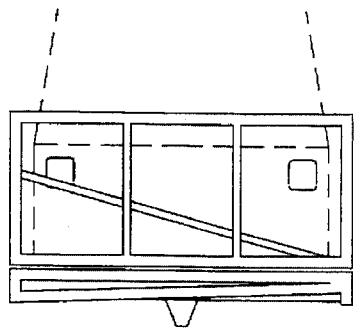
FIG. 27 represents four views of yet another embodiment according to the present invention.
Figure 27C:
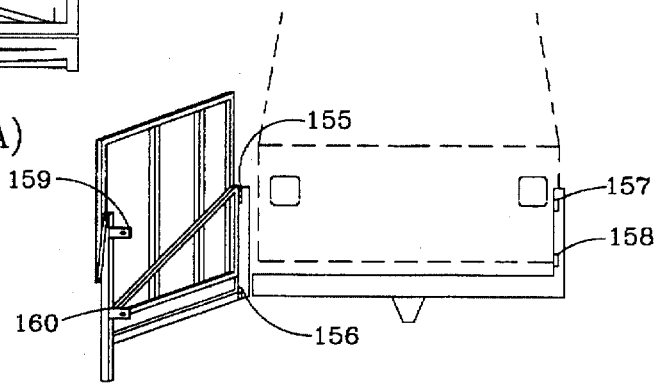
Figure 27B:
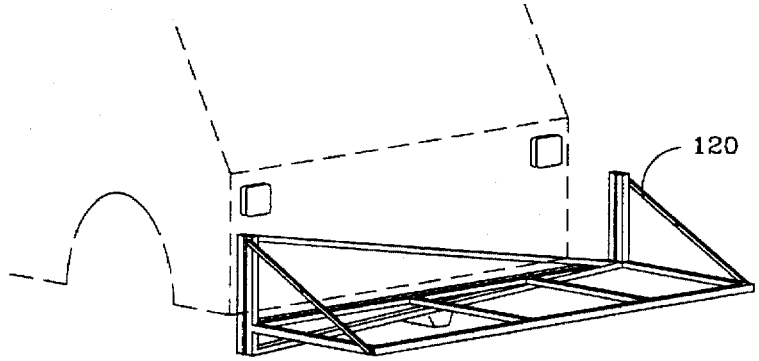
Figure 27D:
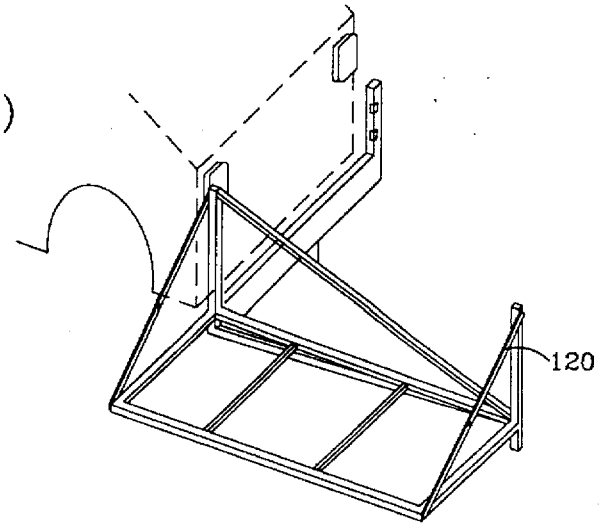

FIG. 26 illustrates another embodiment according to the present invention. This embodiment is somewhat similar in appearance to the preferred embodiment described above. However, there are some differences. An integrated tail light system 110 is included in the embodiment shown in FIG. 26, with the additional function that allows a plurality of lights 111 to "swing" via a linkage 112. This enables the lights 111 to be facing rearward, regardless if the platform assembly 30 is in the horizontal or vertical position. Also, there are not formed members in the design, all components are based on a "cut and fit" philosophy. Also, a "standard" hinge (not shown) is used in lieu of the "hole and tube" (i.e., H50, H51 in FIG. 25) design used in the preferred embodiment, to raise and lower the platform. FIG. 26 shows a "leaf" attachment 115 which is used to increase the width of the platform assembly 30. This embodiment also uses "stays" 113 to support the platform from beneath, wherein the preferred embodiment uses a cutout on the bottom of the platform assembly side plate 34L sides H51 and H52 to engage the riser beam to support the platform assembly 30. The alternative embodiment uses square tubing rather than round tubing as in the preferred version. Note that any material could be used, as long as it has the structural characteristics to hold specific loads. The carrier further includes a pair of telescoping "stays" 113 that support and secure the platform assembly 30 in either the horizontal or vertical position. Also pivotally connected to the stays 113 is a pair of light linkages 112, to allow the lights 111 to swing via the linkages 112 enabling the lights 111 to face rearward regardless if the platform assembly 30 is in the horizontal or vertical position.

Referring to FIG. 27, it shown yet another embodiment comes from the standard practice of making a gate. This version has one or more "stays" 120 that support the platform assembly 30 from above the platform assembly 30. These stays 120 perform the same or similar function to that of hole H50 and hole H51 and hole H52 of side plate 34L of platform assembly 30, when installed on door beam 52 and riser beam 84 when the door assembly 50 is in the closed position. The front check 54A of platform support sleeve 54, in conjunction with lower tube 36E perform the same or similar function as that of the stays 120, when the door beam assembly 50 is open. Also this version uses two small hinges 155, 156 for the door opening function, and uses two latches 157, 158, 159, 160 rather than one to lock and unlock the door assembly 50. This unit uses square tubing, rather than round. This version uses a standard hinge to raise and lower the platform assembly 30, rather than the unique feature of the preferred embodiment, wherein the platform assembly hole H50 encompasses the door beam 52 allowing the platform assembly 30 to swivel around the door beam 52.

The vehicle itself could contain, or have the ability to be modified to contain, an alternative embodiment, that resembles the form, function, operation and/or utility of the preferred embodiment. Whereby, the user could access the device, very similarly to the procedure used to access a bed in a sofa bed, and the basic alternative embodiment remains with the vehicle. Accessory devices could be removable, as in the preferred embodiment.

The dimensions of the platform assembly 30 of 24"×48" are not absolute. The platform assembly 30 could range from 12"×36" to 24"×60", with the current single center hitch. However with other mounting possibilities, dimensions other than those above could be experienced.

Another alternative embodiment, in lieu of a hinge assembly, would be to construct a sliding track, similar to a sliding track in a bureau drawer. The platform assembly/ door assembly, as seen in the preferred embodiment, for example, could be combined into a less complex and weight reducing unit. The assembly would travel to one side or the other, for access to the rear of the vehicle.

Forms of multiple attachments, or multiple receiver hitches could be utilized to stabilize the platform assembly/ door assembly by reducing the complexity, size and weight of the riser assembly.

Another alternative could be to manufacture the riser assembly 70 as a bumper unit with a hinge, or some other device capable of moving a load away from the vehicle. The riser assembly as a bumper, would allow for a "plug and play" effect. If a hinge were part of the alternative design, the platform assembly/door assembly could be installed and removed, via the hinge having a release feature, for storage off the vehicle.

Also the riser assembly 70 could be eliminated if a mounting attachment was designed to mount the door assembly/platform assembly to the frame or body of the vehicle.

The height of the unit, relative to the horizontal plane of the receiver hitch could be altered.

In some cases receiver hitches are not incorporated into a draw bar, but rather the receiver hitch is mounted to the bumper or body of a vehicle.

In still another alternative, the device could have hinge/ latching capabilities, all in one. Wherein, the hinge also functions as a latch mechanism, as well, allowing the user to open the device to the left or to the right at will. In addition to this, if a hinge/latch were designed, one could be able to choose to open the door assembly either left or right depending on the users conditions at the moment. In the preferred embodiment, left or right opening capabilities has to be determined prior to construction.

An alternative could be mounted to the top (anywhere) of the vehicle.

An alternative could be designed where the width of the platform could be adjusted at will, similar to a sliding leaf dining room table.

Still another alternative embodiment would be to incorporate a cargo chest of sufficient structural strength that it could perform the same function a the preferred embodiment's platform assembly/door assembly. In addition the cargo chest sides, front, back and top could be removed, leaving a carrying tray for a carrying bed.

The vehicle body or frame could be used to mount an alternative design.

Another possible alternative to the preferred embodiment, would allow the alternative embodiment to "drop" down to ground level, or lift the load above an average user's height, to afford access to the rear of the vehicle.

Materials other than that indicated in the preferred embodiment could be used. Hollow tubes constructed of plastic or other light weight composite materials, could be injected with structural foam, increasing their structural strength and decreasing weight. Titanium and Chromium-molybdenum, are two others that could be appropriate choices at this time for structural components. Carbon steel can be anodized and hardened to achieve the structural requirements of the preferred embodiment.

Materials other than bronze could be used for bushings. Needle bearings, roller bearings are two examples.

Hardened steel, and alike, could be substituted for stainless steel to manufacture a hinge pin.

A hinge could be manufactured, wherein two pieces, one resembling a "hinge knuckle" and the other a hinge pin connected to a door assembly. The "hinge knuckle" would be a sealed pressurized container having a sealable opening on one end, wherein the hinge pin is partially contained. The hinge pin would be supported by the gas charge, creating a hinge that would be very frictionless.

Another possible embodiment to increase or decrease ground clearance, would come in the form of mechanical, hydraulic, or pneumatic means of regulation. This method adjustment could also apply to the rearwardly clearance of a device from a vehicle.

Extrusions, stamping, drop forging, are examples of, but not necessarily all the examples of, ways to manufacture the pieces of the alternative embodiment.

With the correct structural properties, an injection mold process can be one alternative to manufacturing components from appropriate materials.

The alternative embodiment could be of any color or texture.

Alternative uses for the product could go beyond the recreational user. The invention could be outfitted with a cargo chest modified for cooking purposes for on site events.

The invention can be modified for the movie industry, wherein the platform assembly could be used to carry a remote or manned camera.

Taxi cab/passenger shuttle services can use the invention for additional cargo.

Emergency services units could utilize this invention, whereby emergency supplies are stored in a cargo chest and instantly available for placement at some remote site.

Although illustrative embodiments of the present invention have been described in detail with reference to the accompanying drawings, it is to be understood that the invention is not limited to these precise embodiments. The presently preferred embodiments are to be considered as merely illustrative and not restrictive, and a latitude of modifications, changes and substitutions is intended to be encompassed by the foregoing disclosure.

What is claimed is:

1. A carrier for attachment to a vehicle, for carrying accessory, comprising in combination:
   a riser assembly having a riser beam and being adapted to be secured to the vehicle;
   a door assembly positioned above and substantially horizontal and parallel to said riser assembly and pivotally secured to said riser beam at one end thereof between an open position wherein said door assembly is pivoted away from the vehicle and a closed position wherein said door assembly is pivoted toward the vehicle;
   a platform assembly secured to, and rotatable about a door beam of said door assembly, said platform assembly being shaped to receive an outer contour of said riser beam when said door assembly is in said closed position for carrying the accessory in a generally horizontal position; and
   wherein said platform assembly can be selectively tilted and maintained in a vertical or horizontal position, while secured to said door assembly, when said door assembly is selectively positioned in said open or closed positions.

2. The carrier according to claim 1, wherein said riser assembly further includes a latch assembly that is secured to another end of said riser beam.

3. The carrier according to claim 1, wherein said door assembly includes a hinge assembly that is secured to said one end of said riser beam, for allowing said riser beam to be pivotally secured to said door assembly.

4. The carrier according to claim 3, wherein said door assembly further includes platform support sleeve; and
   wherein said at least one platform support sleeve is secured to one end of said door beam in order to position said platform assembly on said door beam, and to further support and maintain said platform assembly in either to said generally horizontal or vertical positions.

5. The carrier according to claim 4, wherein said platform assembly includes two generally similar side plates, and a plurality of tubular members that interconnect said side plates.

6. The carrier according to claim 5, wherein said platform assembly further includes a platform brake attached to said side plates.

7. The carrier according to claim 6, wherein said platform assembly further includes a pair of knob bolts that are inserted in a pair of holes in said platform brake, for enabling said platform assembly to remain in a vertical position when said door assembly is said open position.

8. The carrier according to claim 7, wherein said at least one platform support sleeve includes a front check that supports said platform assembly in a horizontal position, when said door assembly is in the open position.

9. The carrier according to claim 8, wherein said platform assembly includes a lower tube; and
   wherein when said lower tube is in contact with said front check at the same time as one of said side plates is in contact with the outer contour of said riser beam.

10. The carrier according to claim 1, wherein said platform assembly further includes at least one side plate connecting tube; and
    wherein said door beam, said riser beam, and said at least one side plate connecting tube have circular cross-sections, and are further positioned in parallel horizontal planes.

11. The carrier according to claim 1, wherein said platform assembly is tiltable in an upward direction, from a substantially horizontal position to a substantially vertical position.

12. The carrier according to claim 10, wherein said platform assembly includes at least one side plate in connection with said at least one side plate connecting tube, said at least one side plate includes an opening that receives said door beam and allows said platform assembly to rotate about said door beam.

13. A carrier for attachment to a vehicle, for carrying accessory, comprising in combination:

a riser assembly adapted to be secured to the vehicle;

a door assembly pivotally secured to said riser assembly;

a platform assembly movably secured to said door assembly, for carrying the accessory at a desirable elevation above ground level;

wherein said platform assembly can be selectively tilted and maintained in a vertical or horizontal position, with respect to said door assembly, when said door assembly is selectively positioned in an open position wherein said door assembly is pivoted away from the vehicle and a closed position wherein said door assembly is pivoted toward the vehicle;

wherein said riser assembly includes:

a gusset assembly to be adjustably secured to the vehicle; and a riser beam secured to said gusset assembly;

wherein said gusset assembly includes a plurality of gussets;

wherein said riser beam has two ends;

wherein one end of said riser beam is pivotally secured to said door assembly;

wherein at least one of said plurality of gussets is shaped to partly receive and to support said riser beam in a predetermined direction;

wherein said riser assembly further includes a latch assembly that is secured to another end of said riser beam, in order to facilitate the opening and closing of said door assembly;

wherein said door assembly includes a hinge assembly that is secured to said one end of said riser beam, for allowing said riser beam to be pivotally secured to said door assembly;

wherein said door assembly includes a door beam; and wherein said latch assembly includes a cradle and an actuator crank that are pivotally assembled for removably receiving said door beam.

14. The carrier according to claim 13, wherein said actuator crank includes an actuator base that remains in an open position until it is engaged by said door beam, whereupon, said door beam causes said actuator base to return to a closed position.

15. The carrier according to claim 14, wherein said riser assembly further includes one or more platform stops that are secured to said riser beam so that when said platform assembly is raised to a vertical position, said one or more platform stops hold said platform assembly in a stationary vertical position when said door assembly is closed.

* * * * *